United States Patent [19]
Miloslavsky

[11] Patent Number: 6,021,428
[45] Date of Patent: *Feb. 1, 2000

[54] APPARATUS AND METHOD IN IMPROVING E-MAIL ROUTING IN AN INTERNET PROTOCOL NETWORK TELEPHONY CALL-IN-CENTER

[75] Inventor: Alec Miloslavsky, San Carlos, Calif.

[73] Assignee: Genesys Telecommunications Laboratories, Inc., San Francisco, Calif.

[*] Notice: This patent is subject to a terminal disclaimer.

[21] Appl. No.: 09/010,793

[22] Filed: Jan. 22, 1998

Related U.S. Application Data

[62] Division of application No. 08/929,594, Sep. 15, 1997.

[51] Int. Cl.[7] .................................................. G06F 13/00
[52] U.S. Cl. ........................... 709/206; 709/104; 709/219
[58] Field of Search ..................................... 709/100, 102, 709/104, 105, 201, 202, 206, 217, 219, 223, 226, 300; 379/219, 222, 242, 243, 265

[56] References Cited

U.S. PATENT DOCUMENTS

| | | | |
|---|---|---|---|
| 5,619,648 | 4/1997 | Canale et al. | 709/206 |
| 5,675,637 | 10/1997 | Szlam et al. | 379/142 |
| 5,721,770 | 2/1998 | Kohler | 379/266 |
| 5,884,032 | 3/1999 | Bateman et al. | 709/204 |

*Primary Examiner*—Viet D. Vu
*Attorney, Agent, or Firm*—Donald R. Boys; "Central Coast Patent Agency"

[57] ABSTRACT

An Internet Protocol Network Telephony call center having a plurality of agents for serving clients also processes e-mails addresses to the call center, but not to specific agents. An e-mail server receives and routes the e-mail, and includes a router and a database storing skill set information regarding agents. The router extracts information from the e-mails, matches key words in the extracted information with key words from the skill sets, and routes the e-mails to appropriate agents having the necessary skills to respond to the service requirements in the e-mails.

10 Claims, 24 Drawing Sheets

APPARATUS AND METHOD IN IMPROVING E-MAIL ROUTING IN AN INTERNET PROTOCOL NETWORK TELEPHONY CALL-IN-CENTER

CROSS-REFERENCE TO RELATED DOCUMENTS

The present patent application is a Divisional of the co-pending patent application Ser. No. 08/929,594 filed on Sep. 15, 1997 by the same inventor. The prior application is incorporated herein in its entirety by reference, including priority claims.

FIELD OF THE INVENTION

The present invention in its several aspects presented herein is in the area of telephone communication in the broadest sense; that is, including all multimedia communication aspects of intelligent networks, call-center technology including computer-telephony integration (CTI), and Internet protocol telephony networks and related technology.

BACKGROUND OF THE INVENTION

Telephone is one of the most widely used communication equipments in the world. At first, it was merely a convenient tool to allow people to communicate while they are physically separated. Recently, many companies use telephones to market products and services, provide technical supports to consumer products, allow customers to access their own financial data, etc. Thus, telephone is becoming a major business and marketing tool.

In order to more effectively use telephone for business and marketing purposes, call centers have been developed. In a call center, a large number of agents handle telephone communication with customers. The matching of calls between customers and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database server to obtain information about the customer who has been assigned that phone number. The software can now route the call to an agent who can best handle the call based on predefined criteria (e.g., language skill, knowledge of products the customer bought, etc.). The software immediately transfers relevant information to a computer screen used by the agent. Thus, the agent can gain valuable information about the customer prior to receiving the call. As a result, the agent can more effectively handle the telephone transaction.

It can be seen from the above example that the enabling technology requires a combination of telephone switching and computer information processing technologies. The term commonly used for this combined technology is computer-telephony-integration (CTI).

In recent years, advances in computer technology and telephony equipment and infrastructure as well has provided many opportunities for improving telephone service. Similarly, development of the information and data network known as the Internet together with advances in computer hardware and software has led to a new multi-media telephone system known in the art as Internet protocol network telephony (IPNT). In IPNT as well as in the older intelligent and CTI-enhanced telephony systems, both privately and publicly switched, it is desirable to handle more calls faster and to provide improved service in every way, including such improvements as video calls and conferencing.

In various embodiments and aspects of the present invention described in enabling detail below, new and enhanced apparatus and methods are provided for improving telephony systems and service.

SUMMARY OF THE INVENTION

In a preferred embodiment of the present invention a system for routing an electronic mail (e-mail) to one of a plurality of agents in an Internet Protocol Network Telephony call center is provided, each of the agents having a specific skill set from a variety of possible skill sets, the system comprising an e-mail server adapted to receive the e-mail from a sender; an information extractor for extracting information from the e-mail; a router; and a database accessible to the router and storing skill sets of the agents. The router selects the one of a plurality of agents by matching stored information about the specific skill sets with portions of extracted information from the e-mail. In some embodiments a statistics server (stat-server) records activities of the call center, and the routing performed by the router further uses the recorded activity in the stat-server. Also in some embodiments routing of e-mails to selected agents is load-balanced based on recorded activity stored in the stat-server. An overload threshold may set for number of e-mails to be routed, and senders of e-mails are then notified of a possible delay when the threshold is exceeded.

In some other embodiments the database further stores information on senders of e-mails, and routing performed by the router further uses the stored information on senders of e-mails. The database may also store information about prior relationships of agents and e-mail senders, and the router uses the relationship information in making routing decisions as well. In an alternative embodiment a time limit for response to e-mails by the agents is set, and e-mails not answered within the time limit are rerouted to other agents. In other embodiments the information extractor comprises plural and selectable extraction algorithms. One of the extraction algorithms may include a parser, and the one of the extraction algorithms uses the parser to search for keywords in the e-mail.

The system provided by the several embodiments of the present invention allows e-mails to be addressed for service to a single entity, and then to be distributed to agents for service who are qualified by particular skills to respond to the need of the client sending the e-mail.

DETAILED DESCRIPTION OF THE PREFERRED EMBODIMENTS

Video Telecommunication Routing Systems and Methods (3215)

The present invention comprises a novel video telecommunication routing system and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
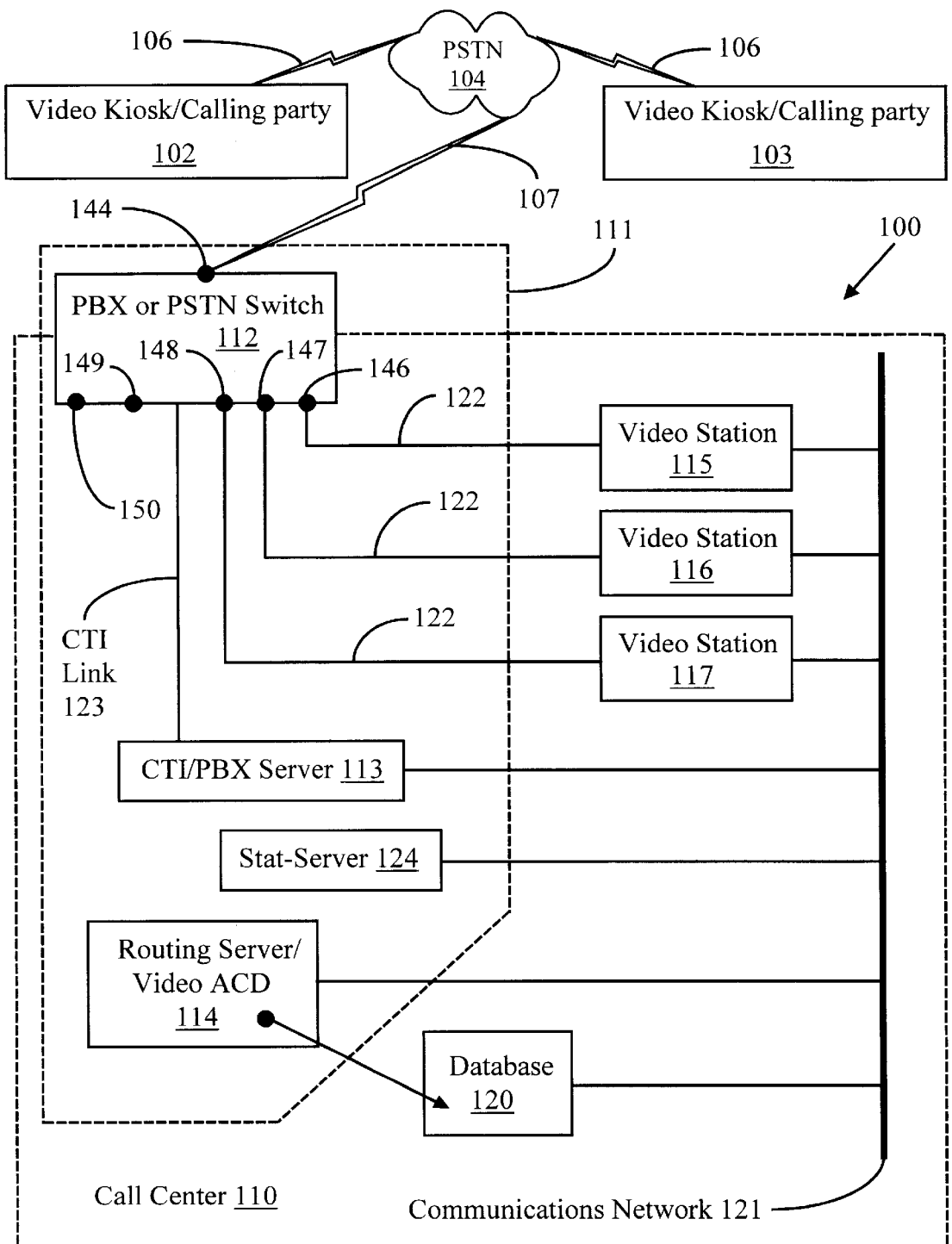
FIG. 1 is a block diagram of a video routing system of the present invention.

FIG. 1 is a block diagram of a video routing system 100 of the present invention. System 100 comprises a video kiosk 102 which originates a video call and a call center 110 which accepts and assigns an appropriate video agent to process the call. Video Kiosk 102 and call center 110 are connected to a public-switched telephone network (PSTN) 104 via telephone lines 106 and 107, respectively. As will be explained below, line 106 is preferably a basic rate interface and line 107 is preferably a primary rate interface. Consequently, video calls between video kiosk 102 and call center 110 are carried by PSTN 104.

Call center 110 comprises a video routing device 111 which accepts calls (including video calls) when predetermined phone numbers are dialed, and then routes individual call to one of a plurality of stations in accordance with predefined criteria. These stations include video stations 115–117. In an embodiment of the present invention, the criteria could vary in real time as the characteristics of the calls and video stations change.

It is possible for call center 110 to process video calls from other video kiosks, such as kiosk 103. Call center 110 may also process conventional voice calls.

In one embodiment of the present invention, video stations 115–117 can be connected to a communication network 121. This network could be a local area network commonly used in many offices. Other devices, such as a database server 122, can also be connected to network 121. Information of video stations, call center personnel and customers can be stored in database server 120. This information is accessible by video stations 115–117. It should be appreciated that database server 120 lo does not have to be a sophisticated database management system. It could be as simple as a table stored in a small data processing device. Video routing device 111 may optionally be connected to database server 120 so as to access the information. This information can also be stored inside video routing device 111.

An example of the types of video telecommunication that can be advantageously handled by routing system 100 is intelligent routing of a video conference between a customer located at video kiosk 102 and an appropriate agent sitting by one of the video stations in call center 110.

Video routing device 111 comprises a switching device 112 for accepting calls from PSTN 104. Switching device 112 could be a automatic call distributor (ACD)/private branch exchange (PBX) or a PSTN switch. It should be appreciated that switching device 112 (hereinafter "ACD/PBX 112") can be a customer premise equipment or may be provided by a telephone communication carrier. ACD/PBX 112 contains a high bandwidth port 144 (for connecting to PSTN 104) and a plurality of low bandwidth ports (such as ports 146–150). Some of these ports can be connected to video stations 115–117. The other low bandwidth ports can be connected to voice-based devices. Each of the low bandwidth ports is assigned one or more directory numbers. In one embodiment of the present invention, two directory numbers (corresponding to two telephone channels) are assigned to a video station.

ACD/PBX 112 is also connected to a CTI/PBX server 113 through a computer-telephony-integration (CTI) link 123. Video routing device 111 comprises two other servers: a routing server/video ACD 114 for routing video calls and a stat-server 124 for storing historic information of call center 110. CTI/PBX server 113 functions as an interface between these two servers and ACD/PBX 112. These three servers are connected to communication network 121. In the present embodiment, the function of these servers are provided by software modules. As explained below, these three servers can be used in combination with a conventional ACD/PBX to achieve the video routing function of the present invention.

High bandwidth port 144 of ACD/PBX 112 is preferably connected to a high capacity telephone line, such as a primary rate interface (PRI) as defined in the CCITT ISDN 1.431 standard. This is one of the standards of the international ISDN protocol.

Low bandwidth ports 146–145 could be a single voice channel or a basic rate interface (BRI) as defined in CCITT ISDN 1.430 standard. Basically, BRI offers two 56 kilo-bit-per-second (Kbps) user data channels (the "bearer" or B channels) and one 16 Kbps signaling channel (the D channel). This interface is also referred to as 2B+D. The combined bandwidth is 128 Kbps. The PRI offers twenty three user data channels and one 64 Kbps signaling channel. This interface is also referred to as 23B+D.

In order to deliver video information at an acceptable level of quality (e.g., 15 frame per second), current compression technology prefers a bandwidth of at least 112 to 128 Kbps. This amount of bandwidth cannot be provided by a single telephone channel but could be provided by an ISDN BRI. Thus, in FIG. 1, line 106 connecting video kiosk 102 to PSTN 104 is preferably a BRI line.

As discussed above, a BRI line essentially comprises two telephone channels. These two telephone channels must be connected to the same low bandwidth port of PBX 142 in order to allow all the video data from video kiosk 102 to be transmitted to the same video station. A conventional PBX does not have the ability to recognize that two telephone channels originated from the same video kiosk. Thus, it is not possible for it to connect them to the same video station.

In one embodiment of the present invention, the servers in video routing device 111 (i.e., CTI/PBX server 113, stat-server 124 and routing server/video ACD 114; these three servers are collectively called the "host") are used in combination with a conventional PBX to route calls originated from video kiosk 102 to the appropriate low bandwidth port. In this embodiment, ACD/PBX 112 is a conventional PBX which comprises a data processing device capable of executing an internal trunk route script. This script contains a plurality of commands which control the operation of ACD/PBX 112. For example, the script can connect calls received at high bandwidth port 144 to low bandwidth ports in accordance with certain criteria, determine the type of music or announcement to play when a call is put on hold, select the strategy to queue calls when all low bandwidth ports are busy, etc.

Figure 2:
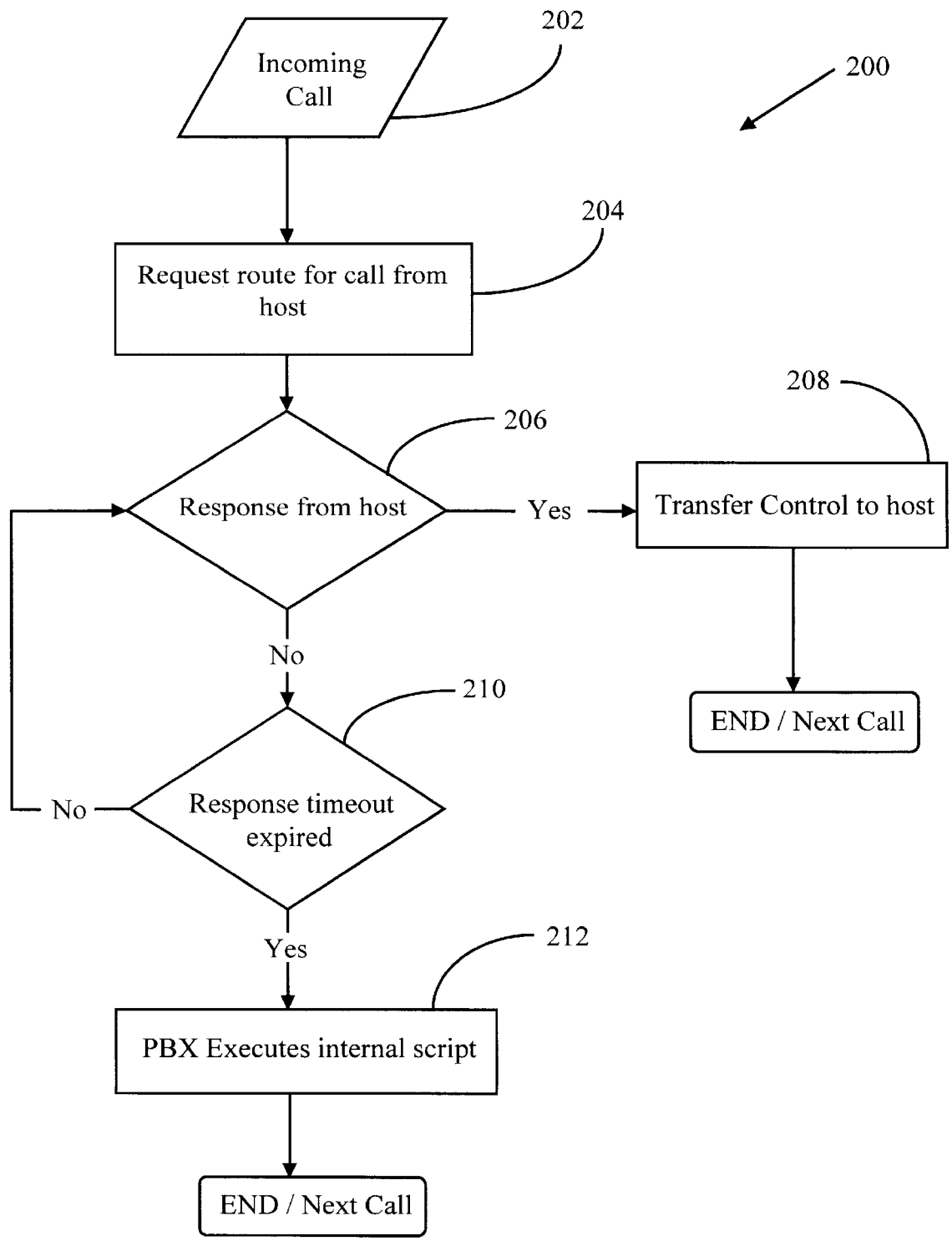
FIG. 2 is a flow chart of a trunk route script which allows a host of the present invention to control the operation of a private branch exchange.

In this embodiment of the present invention, the above described servers are used to determine the operation of ACD/PBX 112 (i.e., the internal trunk route script is essentially disabled). As a result, intelligence and routing decisions are moved from ACD/PBX 112 to the host. FIG. 2 is a flow chart 200 showing a trunk route script which allows the host to control the operation of ACD/PBX 112. ACD/PBX 112 receives an incoming call (step 202). ACD/PBX 112 places a request to the host for routing the call (step 204). ACD/PBX 112 then waits for a response from the host (step 206). If it receives a response from the host, control is transferred to host, which then performs routing operation in accordance with criteria determined by the host (step 208). Flow chart 200 then ends, and another call can be processed by ACD/PBX 112 and the host. If ACD/PBX 112 does not receive a response from the host, it determines whether a response timeout (e.g., 10 seconds) has elapsed (step 210). If the answer is yes, ACD/PBX 112 then executes its internal script (step 212). Thus, the internal script provides a default routing routine for the call center. Flow chart 200 then ends, and another call can be processed by ACD/PBX 112 and the host. If the answer is no, ACD/PBX 112 continues to wait (i.e., flow chart 200 branches back to step 206).

In the preferred embodiment of the present invention, video routing is performed by combining the resources of stat-server 124, routing server/video ACD 114, and CTI/PBX server 113. Stat-server 124 contains a database for storing all relevant activities of call center 110 (e.g., the current status and history of activities of all low bandwidth ports). Routing server/video ACD 114 routes calls to appropriate low bandwidth ports based on factors such as the information contained in stat-server 124, the information delivered by ACD/PBX 112 and the status of various low bandwidth ports. CTI/PBX server 113 acts as a bridge between ACD/PBX 112 at one end and stat-server 124 and routing server/video ACD 114 at the other end. CTI/PBX server 113 is designed to interface with PBXs manufactured by different vendors and present a uniform application program interface (API) to stat-server 124 and routing server/video ACD 114. An advantage of this arrangement is that individual components in video routing device 111 could be replaced and enhanced separately. For example, substantially the same routing server/video ACD and stat-server could be used with PBXs from different manufacturers by changing CTI/PBX server 113.

Figure 3:
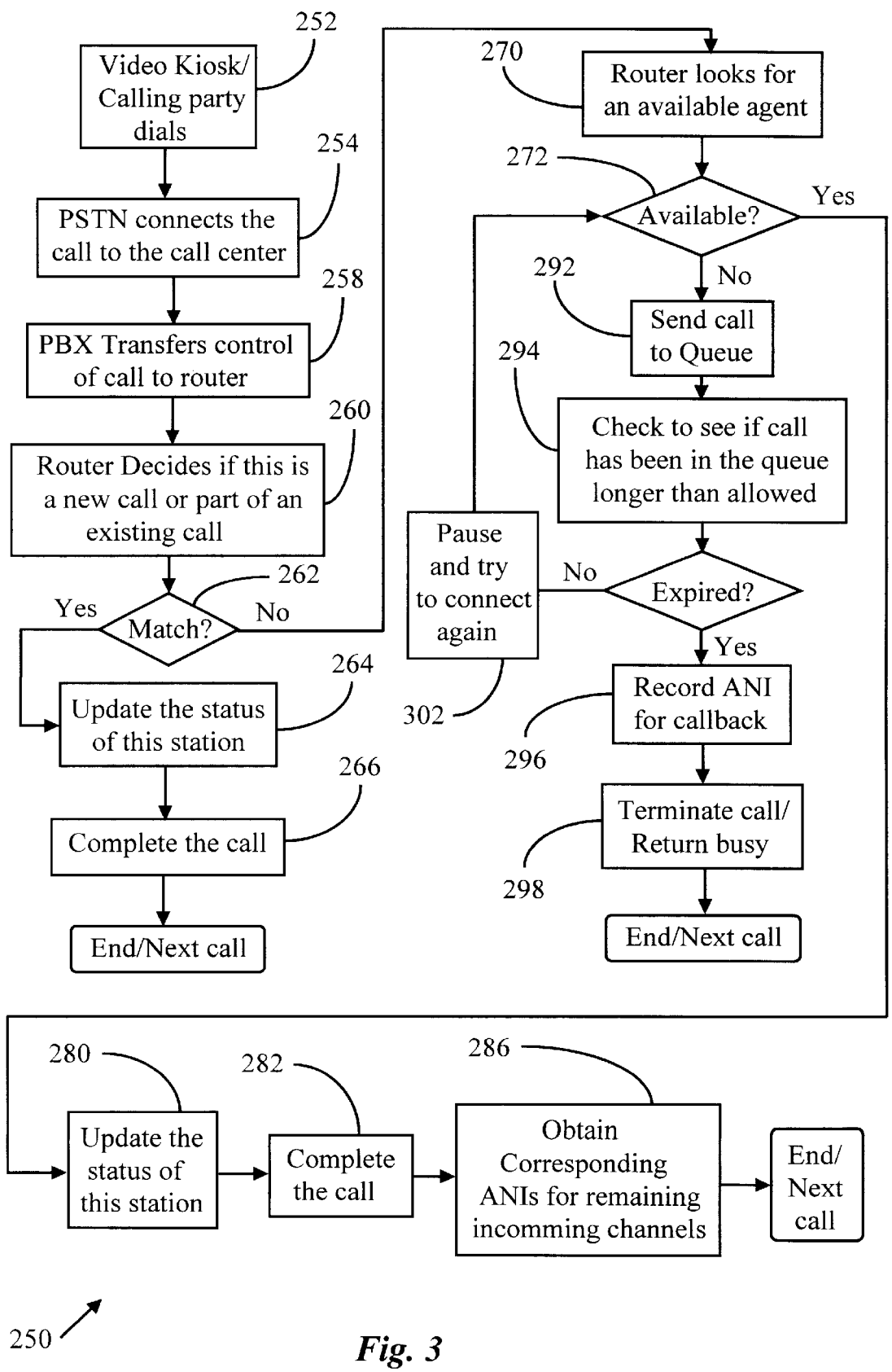
FIG. 3 is a flow chart showing the operation of the video routing system of the present invention.

The operation of an embodiment of video routing system 100 is now described in connection with flow chart 250 of FIG. 3. The video routing system in this embodiment operates in a telephone system in which two separate telephone numbers are associated with an ISDN channel. It should be note that this embodiment can be modified in a manner described below to function in a telephone system in which only one telephone number is associated with an ISDN channel.

In system 100, a regular toll-free 800-number is pre-assigned to carry video information. Thus, video kiosk 102 dials this number twice, each time using a different phone number associated with the ISDN channel (step 252). The time gap for connecting these two calls to call center 110 by PSTN 104 ranges from less than a second to several seconds. Typically, the gap is below one minute.

PSTN 104 connects the calls to call center 110 (step 254). Each time when the 800-number is dialed, PSTN 104 delivers two pieces of information to ACD/PBX 112:

a "dial number identification system" (DNIS) for uniquely identifying the toll-free 800-number and an "automatic number identification" (ANI) for uniquely identifying the telephone line which originates the call. In this embodiment, the above described toll free 800-number and the ISDN line connected to video kiosk 102 are pre-assigned for video conference purposes. The DNIS and ANIs of the corresponding 800-number and ISDN line should have been previously stored in a database (which could be located in routing server/video ACD 114 or database server 120).

In the present invention, ACD/PBX 112 transfers control of calls to the host (step 258). When ACD/PBX 112 receives the DNIS and the first of two ANIs from PSTN 104, it send s these two number s t o CTI/PBX server 113, which in turn sends them to routing server/video ACD 114. Routing decision is not made by ACD/PBX 112. Be cause this DNIS is one of the numbers recognized by routing server/video ACD 114 to be associated with a video call, the video routine algorithm of routing server/video ACD 114 is invoked. This serves as a convenient method for screening out non-video calls.

Routing server/video ACD 114 then determines if this is a new video call or a part of an existing video call (step 260). It branches to a "DN-Relate" database. An example of a DN-Relate database is shown in Table 1:

TABLE 1

DN-Relate

| DN1# | DN2# | Status | Time Stamp | Related ANI |
|------|------|--------|------------|-------------|
| 1000 | 1001 | Available | 9:20 | |
| 1040 | 1041 | Unavailable | 10:10 | |
| 1060 | 1061 | Waiting | 10:32 | 1213 |

It should be appreciated that the format and information contained in table 1 is for illustrative purposes only. The design of the table can be easily changed and enhanced by persons of ordinary skill in the art.

In table 1, the entries under the columns "DN1#" and "DN2#" correspond to the pairs of directory numbers assigned to video stations. Each pair of directory numbers will be connected to the same video station. The column entitled "status" indicates the status of the directory numbers. If the entry is "unavailable," these directory numbers are not available (e.g., video station not yet logged in) and should not be connected to a new video call. If the entry is "available," these directory numbers could be used to connect to a new video telecommunication. If the entry is "waiting," one of the two ANIs has been received, and a second ANI needs to be received to complete the video telecommunication. The entries under "time stamp" contain time-related information.

This information could be used as part of the input variables of a routing algorithm, e.g., the video station waited longest for a video call should be connected first. The entries under "Related ANI" contain the second of two ANIs used for completing a video connection. The entries of this column can be used by routing server/video ACD 114 to connect appropriate video calls to the correct video station.

The last row in table 1 is now explained. The numbers 1060 and 1061 under DN1# and DN2#, respectively, correspond to the directory numbers assigned to the same video station. The status is "waiting," indicating that one of the directory numbers, e.g., 1060 under DN1#, has previously been connected to an incoming video call and this video station is waiting for the second incoming video call. The time under time stamp corresponds to the time the first call is received. The number under "related ANI", i.e., 1213, corresponds to the ANI of the anticipated second call. The method of entering the anticipated ANI in table 1 will be explained below.

Routing server/video ACD 114 compares the ANI obtained from ACD/PBX 112 to the ANIs stored in the DN-Relate database (step 262). If there is a match, routing server/video ACD 114 knows that this video call relates to an existing call. For example, if the received ANI is 1213, the database in table 1 indicates that video routing system 100 is waiting for this ANI to complete a video connection, and this call should be routed to DN# 1061. The status column of the corresponding row should be updated to indicate that video telecommunication has been established (step 264). Routing server/video ACD 114 then connects the video call to the waiting directory number (i.e., the corresponding entry under DN2#) indicated in the database (step 266). Flow chart 250 ends and another call can be processed.

If routing server/video ACD 114 does not find any match, it needs to look for an available video station (step 270). It checks to see if a video station is available (step 272). Assuming that more than one video stations are available, one of them will be selected in accordance with predetermined criteria. For example, the time stamp column of a pair of available directory numbers indicates the time this pair of directory numbers first became available. This information could be used as a factor to select the appropriate video station. After an available video station is selected, routing server/video ACD 114 updates the status of this station (step 280). Specifically, it sets the corresponding status to "waiting" and sets the time stamp in the database. Routing server/video ACD 114 then connects the incoming call to the directory number (under "DN1#") of the selected video station (step 282).

Routing server/video ACD 114 needs to obtain the corresponding ANI for the remaining call (step 286). It jumps to a "ANI-relate" database. This database contains entries of the pairs of phones numbers associated with the ISDN lines assigned for video telecommunication purposes. For example, if a first ISDN line (connected to a first video kiosk) associates with ANIs 1212 and 1213 while a second ISDN line (connected to a second video kiosk) associates with ANIs 3726 and 3727, the ANI-relate database would have entries shown in Table 2:

TABLE 2

ANI-Relate

| First ANI | Second ANI |
|-----------|------------|
| 1212 | 1213 |
| 1213 | 1212 |
| 3276 | 3277 |
| 3277 | 3276 |
| (Other pairs of ANIs) | |

It should be appreciated that the format and information contained in table 2 is for illustrative purposes only. The design of the table can be easily changed and enhanced by persons of ordinary skill in the art.

As an example, if the ANI received by routing server/video ACD 114 is 3276, the ANI-Related database indicates that the ANI associated with the same video call is 3277. Thus, routing server/video ACD 114 is able to obtain the second of a pair of ANIs associated with a video connection. It then returns to DN-Relate database (see table 1) and places number 3277 under the column "related ANI" of the selected video station. Routing system 100 then waits for incoming calls having this second ANI. Flow chart 250 ends and waits for the next call.

If there is no available video station, routing server/video ACD 114 sends the call to a queue to wait for an available station (step 292). In the present invention, a new method is used to queue video calls. This method is different from those used on standard voice calls. As stated earlier a call cannot be connected to one point and then disconnected to another point. Such operation will destroy the call. As a result, the new method, described below, is needed to handle the queuing.

In step 294, routing server/video ACD 114 checks to see if the video call has been in the queue for longer than an allowed time (i.e., the timeout period). If the allowed time has expired, routing server/video ACD 114 records the ANI that attempts to call the call center (step 296). When a video station is later available, this ANI can be retrieved by a video agent and a call can be placed by that video agent to the kiosk (or person) which had originated the call. In the mean time, ACD/PBX 112 is instructed to disconnect the video call and return a busy signal (step 298). This is the least desirable option. It should be used when no video agents are available and none are seen to become available within a relatively short time frame. The timeout period is set to reflect this consideration.

If the video call has been in the queue for shorter than the allowed time, routing server/video ACD 114 continues to try to connect the call (step 302). That is, flow chart 250 loops back to step 272. During this period of time, the video call remains in a ringing state. The loop continues until the timeout has elapsed. At that time, steps 296 and 298 are executed.

It can be seen from the above description of flow chart 250 that video routing device 111 is able to receive video calls and connect them to appropriate video stations (if available) in call center 110. Video routing device 111 could also access database server 120, if there is a need to do so, to obtain additional information about video kiosk 102 and the video station selected for connection. This information can be sent to an agent monitoring the selected video station.

As pointed out above, video routing device 111 can also be used for the situation where only one phone number is assigned to an ISDN channel. In this case, there is no need to generate the "ANI-relate" database because the entries in the first and second columns will be the same. The calling ANI is directly written to the appropriate row of the "related ANI" column. This is because the calling ANI and the anticipated second ANI are the same.

Figure 4:
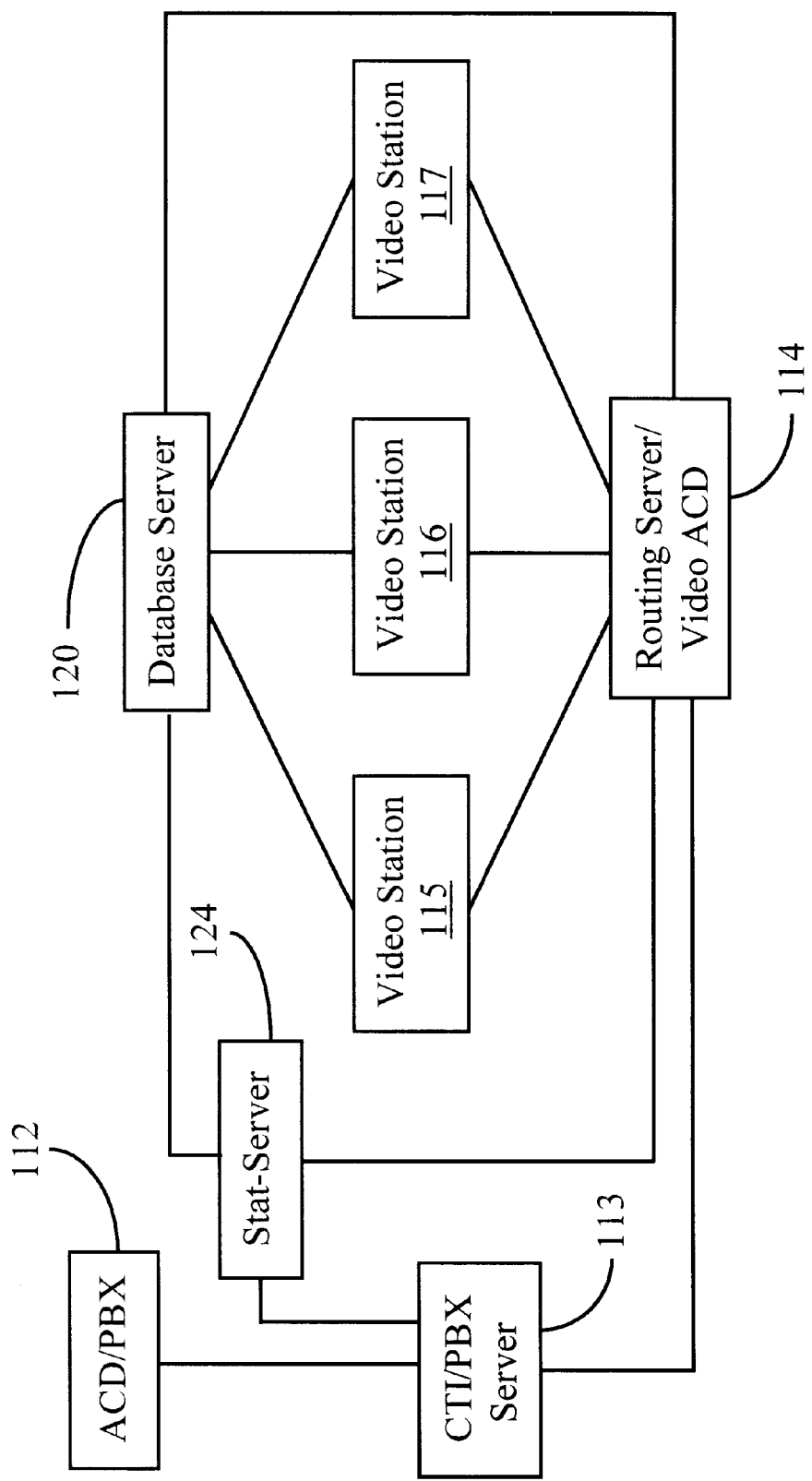
FIG. 4 is a drawing showing the logical connection between components in a call station of the present invention.

FIG. 4 is a drawing showing the logical connection between components in call center 110. It can be seen from FIG. 4 that ACD/PBX 112 is connected only to CTI/PBX 113. Information regarding calls is communicated to stat-server 124 by CTI/PBX 113 so that stat-server 124 can record all telephone transactions. CTI/PBX server 113 is also connected to routing server/video ACD 114 for allowing it to route video calls. Routing server/video ACD 114 is connected to stat-server 124 because the information stored therein is used by routing server/video ACD 114 to route calls. Further, stat-server 124 records routing instructions of routing server/video ACD 114. Routing server/video ACD 114 is also connected to database server 120 to obtain additional information for routing calls. Stat-server 120 and database server 120 are connected so that information contained therein can be shared and updated.

Video stations 115–117 are connected to routing server/video ACD 114 so that video calls can be routed thereto. Video stations 115–117 are also connected to database server 120 so that information regarding customers, products, etc., can be downloaded from database server 120.

It should be appreciated that even though CTI/PBX 113, routing server/video ACD 114, stat-server 124 and database server 120 are shown as separate components, they could be combined into one, two or three components residing on one or more data processing devices.

Apparatus and Methods for Coordinating Telephone and Data Communications (3216)

The present invention comprises a novel system and related methods for coordinating telephone and data communications. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 5:
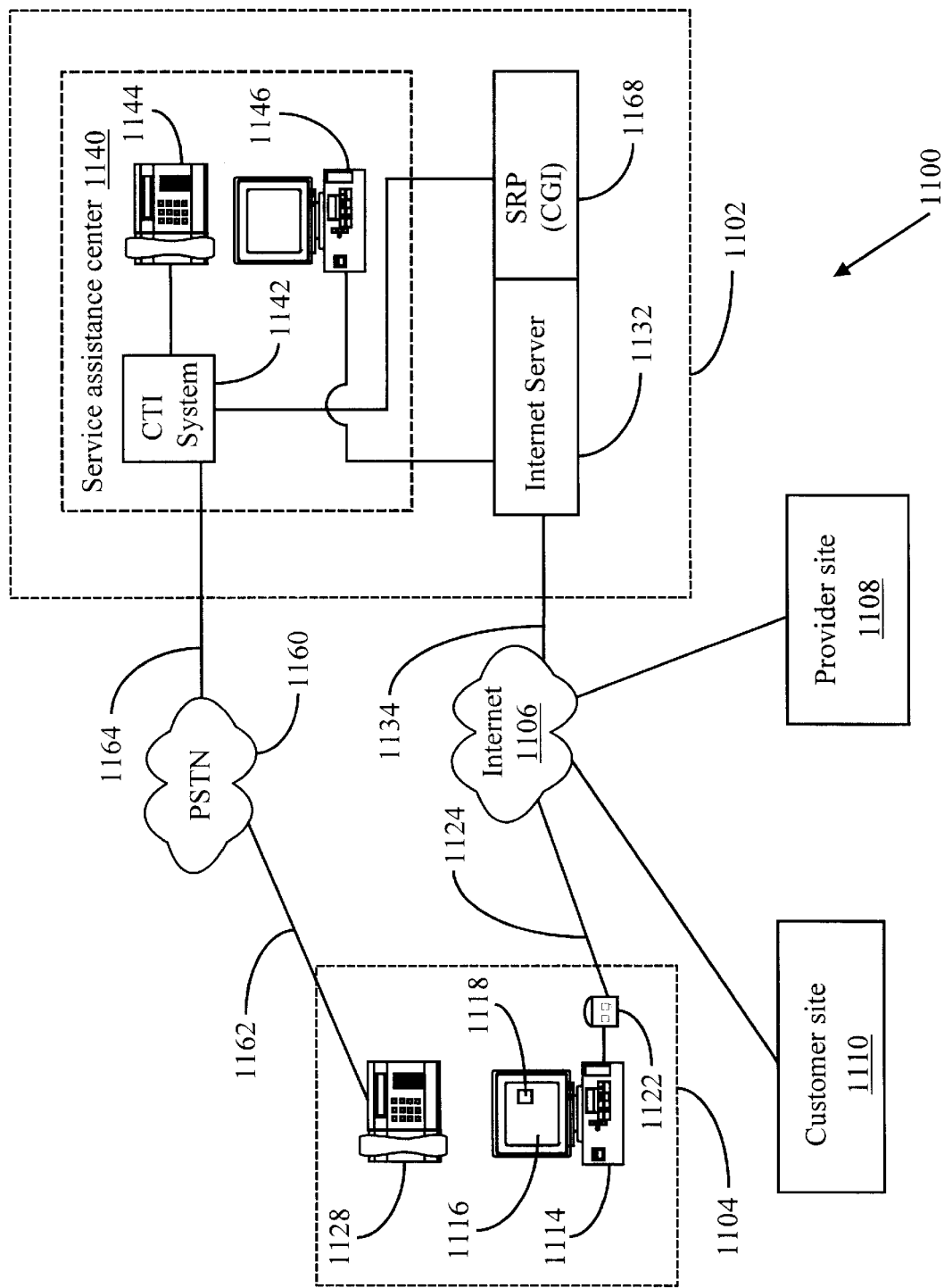
FIG. 5 is a block diagram of a voice and data communication system of the present invention.

FIG. 5 is a block diagram showing a voice/data communication system 1100 operating in accordance with the present invention. System 1100 comprises a provider site 1102 and a customer site 1104 connected by a data communication network 1106, such as the Internet. It should be appreciated that the Internet is used here as an exemplary data communication network, and the present invention is not limited to be used in Internet. In this embodiment, provider site 1102 and customer site 1104 are engaged in electronic commercial transactions. Thus, provider site 1102 sends (via Internet 1106) product information, order forms, confirmation notices, etc. to customer site 104 and customer site 1104 sends in (again via Internet 1106) orders, shipping address, and payment information, etc. to provider site 1102. In this system, provider site refers generally to a location which sells information, products or services and customer site refers to a location which requests such information, products or services. A plurality of others provider site, such as provider site 1108, and a plurality of other customer sites, such as customer site 1110, are also connected to Internet 1106.

It should be appreciated that the present invention relates to coordinating data and telephone communications between any two sites. The description of provider sites and customer sites pertains to an important (but not the only) application of the present invention envisioned by the inventor. The present invention can be applied to many applications.

Customer site 1104 comprises a client computer 1114 running a browser 1116 of the present invention. Client computer 1114 is connected to a modem 1122 which is coupled to a TCP/IP connection 1124. As a result, client computer 1114 is able to gain access to the Internet 1106. A user in customer site 1104 use browser 1116 to communicate with other computers connected to Internet 1106.

Customer site 1104 also contains a telephone 1128 which allows the user in customer site 1104 to make telephone communication with a service agent in provider site 1102. Telephone 1128 is coupled to a public switched telephone network (PSTN) 1160 via a telephone channel 1162. In the prior art system, it is not possible for the system to coordinate voice (via PSTN 1160) and data (via Internet 1106) communication between the user and the service agent. One aspect of the present invention allows such coordination to take place. As a result, the user and the service agent can display the same data (e.g., the same web page) at their respective computer screens and communicate orally (or visually if picture-phones are installed in both sites) at the same time.

Provider site 1102 comprises a server 1132 connected to Internet 1106 through a TCP/IP connection 1134. Server 1132 supplies various web documents (e.g., product information, order forms, etc.) to browsers that request the documents. Provider site 1102 contains a service assistance center 1140 in which a number of service agents can take telephone calls from users in various customer sites. Service assistance center 1140 contains a computer-telephony-integration (CTI) system 1142 for accepting calls from PSTN 1160 and routing calls to a plurality of telephones, one of them is shown as telephone 1144. Service assistance center 1140 also contains a plurality of computers, one of them is shown as computer 1146. CTI system 1142 is coupled to PSTN 1160 via a high bandwidth telephone channel 1164, such as a primary rate interface (PRI) as defined in the CCITT ISDN 1.431 standard. The service agents use both the computers and telephones to efficiently provide services to various users in the customer sites.

It should be appreciated that the CTI system 1142 is not limited to route voice communication. It can also route other types of communication. A CTI system that can route video calls has been disclosed in a copending patent application entitled "Video Telecommunication Routing Systems and Methods" filed Oct. 25, 1995 in the names of Alec Miloslavsky and Jason Goecke. This copending patent application is hereby incorporated by reference. It should also be appreciated that service assistance center 1140 and provider site 1102 can be in different physical locations, as long as they are electrically connected in the manner described below.

The Internet side of the invention is first described. Browser 1116 is a piece of software that can display information sent by server 1132. A protocol for communication between customer site 104 and provider site 1102 using Internet 1106 is the HTTP or web protocol. One of the advantages of web protocol is that the display on browser 1116 is a graphic document (commonly called a web page) containing text, images, and other information. Each web page has an address in a recognized format—the URL, or Uniform Resource Locator—that enables computers all over the world to access it. Browser 1116 sends a request to the URL of a web page in server 1132. Server 1132 respond with a file encoded in a special language called the hypertext markup language (HTML). This language contains "tags" which allows a programmer to specify the appearance of the web page and set up hyperlinks to other HTML documents (located in the same or other servers). As a result, the user in customer site 1104 is able to use browser 1116 to access information in server 1132.

The web protocol also contains various mechanisms, e.g., common-gateway-interface (CGI), POST and GET methods, etc., for browser 1116 and server 1132 to communicate with each other. As a result, it is possible to design a system for the user in customer site 104 to place orders through the web page. For example, the user can click on an icon on a web page to order a product associated with the icon. Server 1132 receives and processes the order. This is one of the methods for carrying out electronic commercial transactions.

When the user in customer site 104 is reviewing information on browser 1116 or is about to place an order, the user may request the attention of a service agent in service assistance center 1140. For example, the user may want to ask additional information or provide confidential information (such as a credit card number) orally to the service agent. It is desirable for the service agent to display on his/her computer 1146 the same web page displayed on browser 1116 while interaction with the user through telephone. It is also desirable for the service agent to obtain as much information about customer site 1104 as possible prior to commencing telephone communication with the user.

In the prior art methods, the user has to look up the telephone number of the service assistance center and manually call the center. After connected to a service agent, the user has to explain his/her needs, and if necessary, describe to the agent the web page being displayed on the browser. The service agent needs to identify the user and may have to access the server to find the web page displayed on the user's computer. It can be seen that this method is very slow and ties up valuable time of a service agent. As a result, prior art service assistance centers require many service agents in order to provide adequate service to customers.

One aspect of the present invention provides automatic coordination between the telephone communication and the Internet communication. As an example, when the telephone communication is established, the web page displayed by browser 116 is automatically displayed on computer 1146 together with information about customer site 1104. As a result, the service agent may anticipate the user's needs and immediately provides desired services to the user. It should be appreciated that telephone communication in the present system includes voice and/or video communication through PSTN 1160.

In the present invention, the web page originated from server 1132 contains an icon, such as a button 1118, positioned at a convenient location of the web page. This icon is displayed by browser 1116. When the user wishes to initiate telephone communication with service assistance center 140, he/she can click on (i.e., select) button 118. There is no need for the user to look up the telephone number of service assistance center 1140. One way for browser 1116 to display a clickable button 1118 is by embedding (at the appropriate place in the associated HTML document) a tag of the form: <A HREF="phone.html"> <IMG src="HTTP://" button.gif"> </A>. In this example, "button.gif" is the URL addresses of a graphic file (in a popular graphic format called GIF) associated with the button icon and "phone-.htrnl" is the URL address of a file which can respond to the clicking. This tag tells a browser to display the "button" image (which is preferably stored in server is 1132), and to treat it as a clickable item that, whenever a user clicks on it with a mouse, triggers a connection to the file "phone.html" (also preferably stored in server 1132).

When button 1118 is clicked, browser 1116 sends a telephone service request to "phone.html" in server 1132. Server 1132 then sends the request and associated data (e.g., the identity of customer site 104 and the HTML document associated with the web page displayed on browser 1116) to a service request process (SRP) 1168. SRP 1168 is a software module which could run on server 1132 or on a separate data processing device. SRP 1168 selects an available service agent in accordance with predetermined criteria (e.g., availability of agents, previous interaction between a certain agent and customer site 1104). Assuming that the service agent associated with computer 1146 is selected, the HTML document previously sent to customer site 1104 is delivered to computer 1146. Computer 1146 contains a browser and can display the HTML document.

As a result, the service agent who will interact with the user in customer site 1104 is able to see the same web page the user is seeing. As explained below, other information about customer site 1104 can also be sent to computer 1146. This information is accessible by the service agent.

One aspect of the present invention is a CTI system that can provide a telephone connection between the user and the service agent associated with computer 1146. FIG. 2 shows a block diagram of CTI system 1142 which works with SRP 1168 to provide such a connection. Reference numerals in FIG. 6 that are the same as that for FIG. 5 refer to the same elements.

CTI system 1142 comprises a switching device 1202 for accepting calls from PSTN 1160. Examples of switching device 1202 are (but not limited to) an automatic call distributor (ACD)/private branch exchange (PBX) and a PSTN switch. It should be appreciated that switching device 1202 (hereinafter "PBX 202") can be a customer premise equipment or may be provided by a telephone communication carrier. PBX 1202 contains a high bandwidth port 1204 (for connecting to PSTN 1104) and a plurality of low bandwidth ports (such as ports 1206–1209). Each of the low bandwidth ports is assigned one or more directory numbers. Some of these ports can be connected to telephones used by service agents (such as telephones 1213 and 1216).

Figure 6:
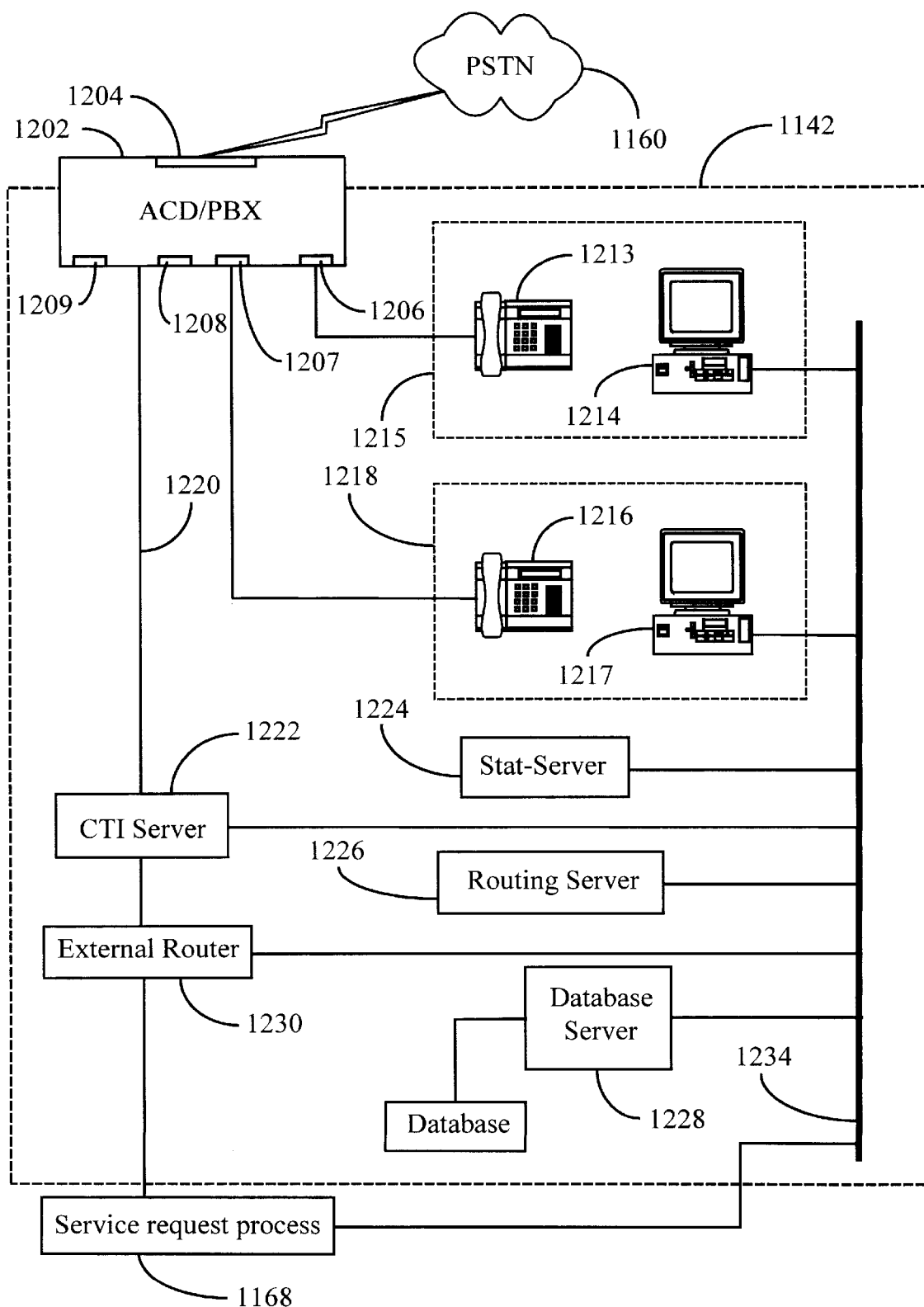
FIG. 6 is a block diagram of a computer-telephony-integration system of the present invention.

In order to facilitate the operation of service agents, each agent has easy access to a telephone and a computer. In FIG. 6, a telephone and a computer is set up as a station and assigned to a service agent. For example, telephone 1213 and a computer 1214 is grouped as a station 1215 while telephone 1216 and a computer 1217 is grouped as a station 1218. When a service agent logs in, he/she can enter his/her identification information to computers 1214 and 1217, respectively. As explained above, information on the service agents (such as language skill, knowledge of products, etc.) could be used by SRP 1168 as some of the factors in selecting an appropriate service agent to interact with a particular user.

PBX 1202 is connected to a CTI server 1222 through a CTI link 1220. CTI system 1142 also comprises a stat-server 1224 and a routing server 1226. Stat-server 1224 stores all relevant activities of CTI system 1142 (e.g., the current status and history of activities of all low bandwidth ports). Routing server 1226 routes calls to appropriate low bandwidth ports based on factors such as the information contained in stat-server 1224, the information delivered by PBX 1202 and the status of various low bandwidth ports. CTI system 1142 contains a database server1 228 containing information of provider site 1102, e.g., agent skills, and information pertaining to the customers of provider site 1102, including information of customer site 1104. CTI system 1142 also contains an external router 1230, working together with SRP 1168, for reserving a specific telephone channel between customer site 1104 and the telephone in the station of the selected service agent. The detail operation of external router 1230 will be described below.

One function of CTI server 1222 is to act as a bridge between PBX 1202 at one end and stat-server1 224, external router 1230 and routing server 1226 at the other end. CTI server 1222 is designed to interface with PBXs manufactured by different vendors and present a uniform application program interface (API) to stat-server 1224, external router 1230 and routing server 1226. An advantage of this arrangement is that individual components in CTI system 1142 could be replaced and enhanced separately. For example, substantially the same routing server, external router and stat-server could be used with PBXs from different manufacturers (e.g., AT&T, Northern Telecom or Ericsson) by changing CTI server 1222. Specifically, different versions of a particular implementation of CTI server 1222 can be designed to match with switches made by different manufacturers (provided that the switches have a CTI link). These versions communicate with the same routing server, external router and stat-server through a standard protocol which is switch-independent.

In one embodiment of the present invention, stat-server 1224, external router 1230, routing server 1226, external router 1230, and computers 1214 and 1217 are connected to a communication network 1234. In the present embodiment, the function of these servers and external router 1230 are provided by software modules running in one or more computers. It should be appreciated that even though CTI server 1222, routing server 1226, stat-server 1224, external router 1230 and database server 1228 are shown as separate components, they could be combined into one, two, three or four components residing on one or more data processing devices.

SRP 1168 is connected to external router 1230 and communication network 1234. After a user in customer site 1104 clicks on button 1118 and issues a request, SRP 1168 determines the status of the agent computers (e.g., whether computers 1214 and 1217 have been turned on) and the identity of agents in the stations. SRP 1160 may need to access database server 2128 and stat-server 1224 to obtain the necessary information. SRIP 1168 then selects an appropriate agent and notifies external router 1230. External router 1230 selects a telephone number of a routing point of PBX 1202 and associate this telephone number with the directory number of PBX 1202 which connects to the telephone of the selected service agent. The routing point is a component in PBX 1202 which generates a CTI redirect request to CTI server 1222 whenever a call reaches this component. This routing point could be a control directory number, virtual directory number, or a trunk/dial number identification system (DNIS). The exact nature of the telephone number is not important, as long as it is a number which can reach the routing point. Thus, the telephone number could be a private network number, a public network number or an international number.

External router 1230 notifies CTI server 1222 and SRP 1168 of this telephone number. SRP 1168 causes server 1132 to send this telephone number to browser 1116 in customer site 1104. Browser 1116 can either display this number so that the user can dial it manually or dial the number electronically and notifies the user about the status of the telephone connection. When PBX 1202 receives a call having this telephone number, it directs the call to CTI server 1222. CTI server 1222 sends the call to external router 1230, which then delivers this call to the directory number associated with the selected service agent.

PBX 1202 keeps a number of such routing points specifically reserved to accommodate requests from SRP 1168. These routing points are used as "semaphores" by SRP 1168. They are allocated and deallocated as needed. Once a routing point is reserved by SRP 1168 for a particular service agent, it is considered unavailable. Once the call is routed to the service agent, the routing point is again usable.

Figure 7:
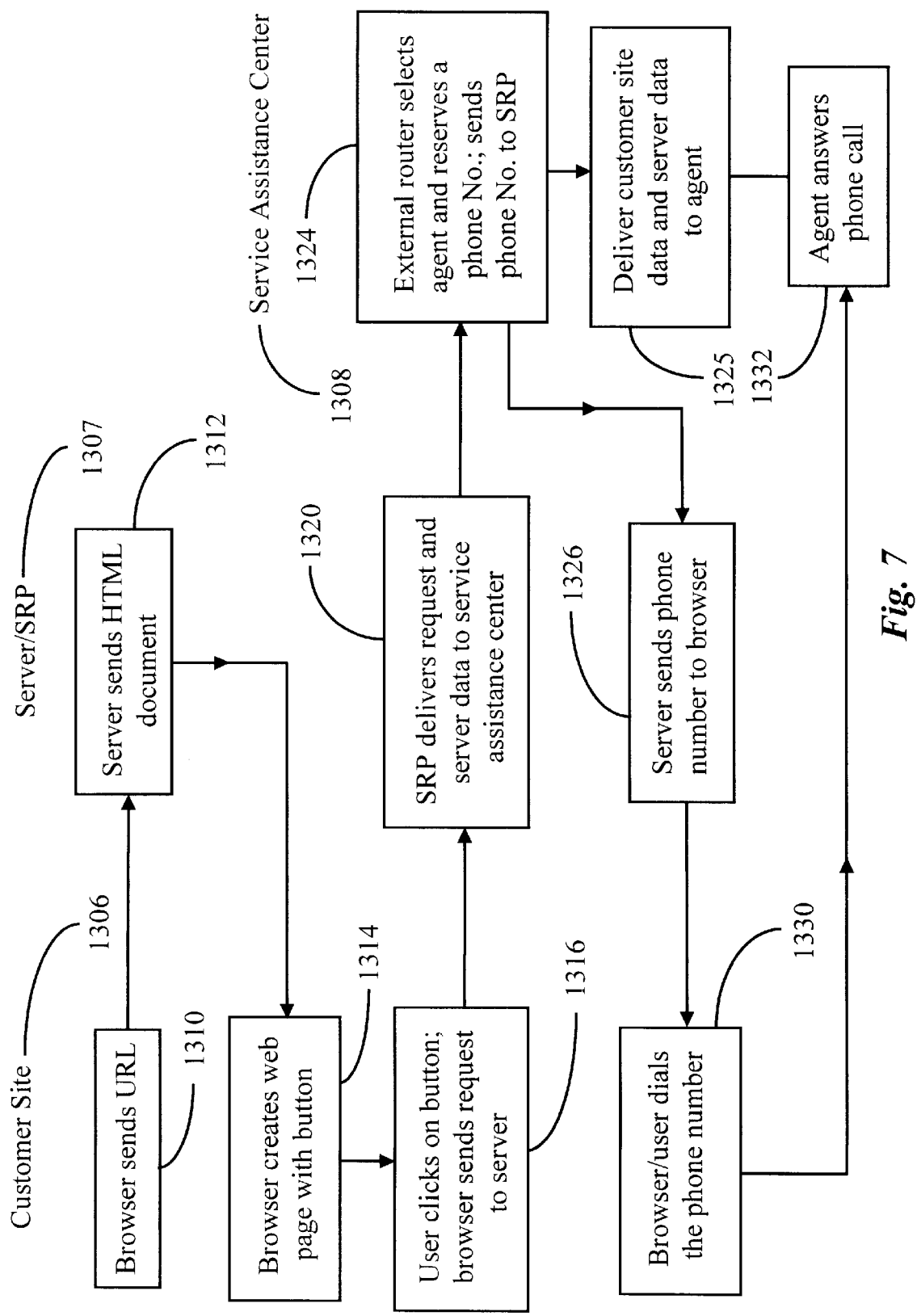
FIG. 7 is a flow diagram showing the flow of events during an exemplary data and voice communication session conducted in accordance with the present invention.

FIG. 7 is a flow diagram showing the flow of events during an exemplary data and voice communication session using the CTI system shown in FIG. 6. In FIG. 7, operations are grouped under three columns 1306–1308 indicating the locations in which the operations take place: customer site, server/SRP and service assistance center. When a session starts, browser 1116 in customer site 1104 sends a URL to server 1132 (operation 1310). Server 1132 responds by sending browser 1116 a HTML document (operation 1312). This document contains a tag causing browser 1116 to display a clickable button. Browser 1116 receives the HTML document and creates a web page based on the HTML document (operation 1314). After reviewing the displayed web page, the user clicks on button 1118. Browser 1116 responses by sending a request for an agent (together with data identifying customer site 1104, if needed) to server 1132 (operation 1316). Server 1132 delivers the request and the data to SRP 1168, which in turn delivers the information to external router 1230 (operation 1320). External router 1230 selects a service agent. It reserves a telephone number and associates it with a telephone used by the selected service agent. This telephone number is sent to SRP 1168 (operation 1324). At this time, the service agent receives information regarding customer site 1104 and the HTML documents previously sent to browser 1116 (operation 1325). The telephone number received by SRP 1168 is sent to server 1132, which in turn sends the number to browser 1116 (operation 1326). Browser 1116 (or the user) then dials the telephone number so as to establish telephone connection to the selected service agent (operation 1330). As pointed out above, this telephone lo number causes PBX 1202 to route the call to the directory number associated with the selected service agent. The service agent receives the telephone call (operation 1332). At this time, the service agent has already acquired a lot of information about customer site 1104 and the web pages previously delivered thereto.

Another embodiment of the present invention is now described. In this embodiment, call center 1102 initiates the telephone call (in response to a request by a user in customer site 104) instead of customer site 1104 initiates the telephone call. Referring now to FIG. 5, the user requests a telephone call by clicking on button 118 (which could be labeled a "call me" button). A dialog box appears. It asked the user to enter the telephone number of phone 1128. Browser 1116 then sends the telephone number of phone 1128 to server 1132 in provider site 1102. Alternatively, the telephone number could have been previously stored in computer 1114 (e.g., in the form of a persistent client state information commonly called the "cookies" in Internet technical literature). Server 1132 then sends the telephone number and associated data (e.g., the identity of customer site 1104 and the HTML document associated with the web page displayed on browser 1116) to SRP 1168. SRP 1168 then requests service assistance center 1140 to call this telephone number and select an agent to talk with the user.

Browser 1116 could send other identification information instead of the telephone number to server 1132. For example, the name or Internet address of customer site 1104 could be sent. Server 1132 or SRP 1168 could maintain a customer list associating the identification information with the telephone number of phone 1128. As a result, service assistance center 1140 could call telephone 1128 based on information on this customer list.

Other information can also be sent by browser 1116. For example, the user can specify a certain time period on a certain date as an appropriate time for receiving calls from service assistance center 1140.

Figure 8:
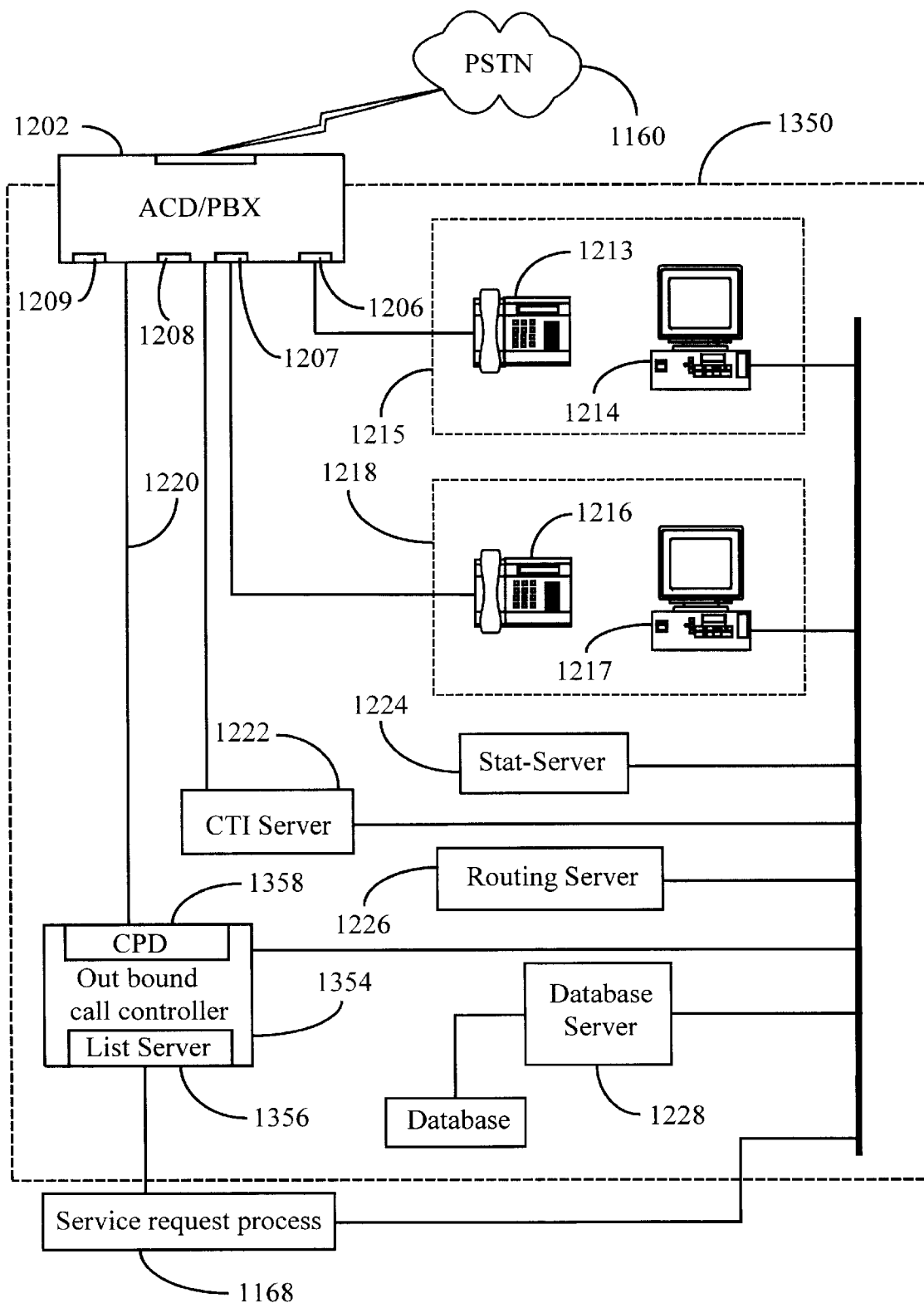
FIG. 8 is a block diagram of another computer-telephony-integration system of the present invention.

FIG. 8 is a block diagram of a CTI system 1350 which can call telephone 1128 in accordance with the present invention. Reference numerals in FIGS. 6 and 8 that are the same refer to the same elements. It should be appreciated that a CTI system can be formed by combining elements in FIGS. 6 and 8 so as to allow either provider site 1102 or telephone 1128 to initiate the telephone call.

In FIG. 8, SRP 1168 is connected to an outbound call controller 1354, which is in turn connected to switching device 1202 and communication network 1234. After SRP 1168 received the telephone number of phone 1128, it deposits the number in a list server 1356. This server is essentially a queue which contains all the telephones which needs to be dialed out by service assistance center 1140. Typically, the queue is arranged in a first-in-first-out manner. However, it is possible to set up a different priority scheme for scheduling the calls.

Outbound call controller 1354 dials the telephone numbers in list server 1356. The progress of the call is monitored by a call progression detector (CPD) 1358. Detector 1358 returns the status of the call (e.g., line busy, call received by a facsimile machine, call received by a modem, etc.). Outbound call controller 1354 takes appropriate actions based on this status, e.g., it can dial another number in list server 1356 if the telephone corresponding to a previously dialed number is busy.

When the telephone number corresponding to phone 1128 is dialed and CPD 1358 determines that the line is not busy, outbound call controller 1354 requests routing server 1226 to find a free agent who is qualified to handle the call to customer site 1104. SRP 1168 can then send the digital data (e.g, the HTML document displayed on the user's computer) to the selected agent. As a result, an agent in service assistance center 1140 is able to talk with a user in customer site 104 while reviewing the web page displayed on browser 1116 in to customer site 1104.

In a different version of this embodiment, SRP 1168 can estimate the length of time for service assistance center 1140 to call telephone 1128 based on the number of telephone numbers already in list server 1356 and the availability of agents. If this length of time is excessively long, SRP 1168 may ask Internet server 1132 to send a message to browser 1116 informing the user of the estimated waiting time. The user has the freedom to request a rescheduling of the call.

Figure 9:
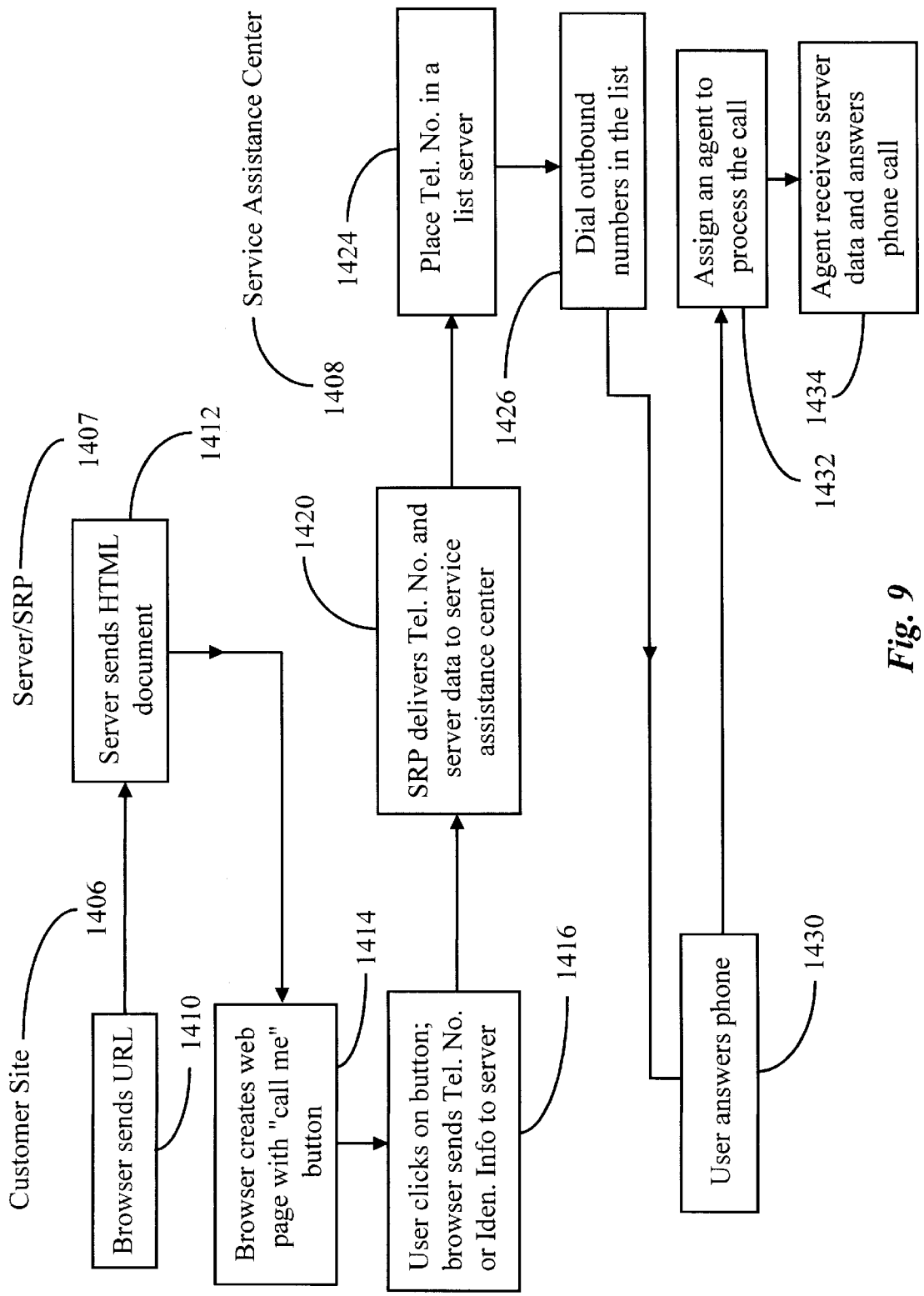
FIG. 9 is a flow diagram showing the flow of events during another exemplary data and voice communication session conducted in accordance with the present invention.

FIG. 9 is a flow diagram showing the flow of events during an exemplary data and voice communication session using the CTI system shown in FIG. 8. In FIG. 9, operations are grouped under three columns 1406–1408 (similar to that of FIG. 7) indicating the locations in which the operations take place: customer site, server/SRP and service assistance center. When a session starts, browser 1116 in customer site 1104 sends a URL to server 1132 (operation 1410). Server 1132 responds by sending browser 1116 a HTML document (operation 1412). This document contains a tag causing browser 1116 to display a clickable button. Browser 1116 receives the HTML document and creates a web page based on the HTML document (operation 1414). After reviewing the displayed web page, the user clicks on "call me" button 1118. Browser 1116 responses by sending a request for a phone call, together with telephone number and/or data identifying customer site 1104, to server 1132 (operation 1416). Server 1132 delivers the request and the telephone number to SRP 1168, which in turn delivers the number to outbound call controller 1354 (operation 1420). The telephone number is placed in list server 1354 (operation 1424). Controller 1354 dials outbound phone calls from number is list server 1354 (operation 1426). When the user in customer site 1104 answers the call (operation 1430), an agent in service assistance center 1102 is assigned to handle the call (operation 1432). Data related to customer site 1104 and the web page viewed by the user is delivered to the agent. The agent can then answer the call with all necessary information on hand (operation 1434).

Methods and Apparatus for Implementing a Network Call Center (3219)

The present invention comprises a novel call center architecture and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 10:
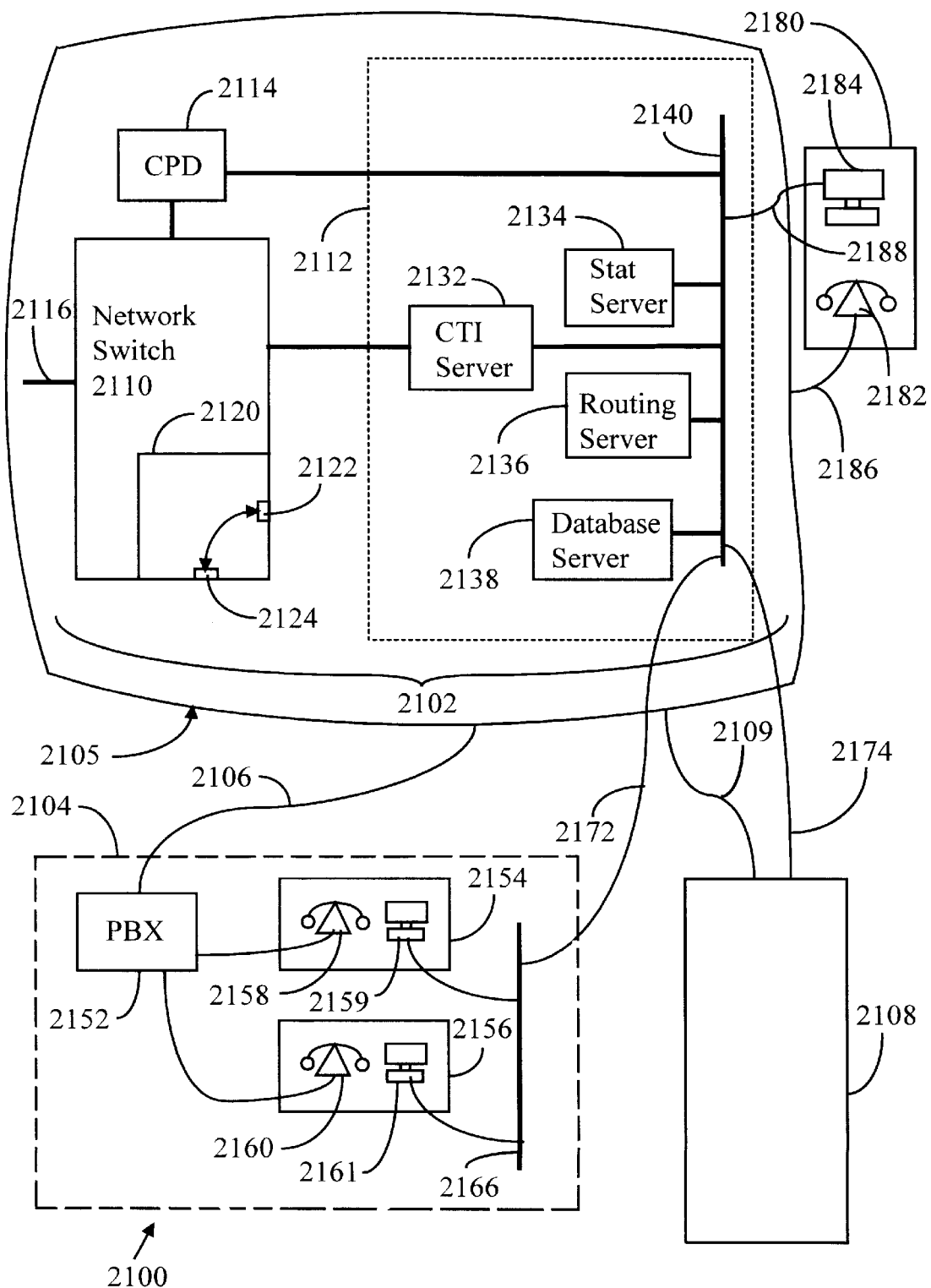
FIG. 10 is a drawing showing a call center architecture of the present invention.

FIG. 10 is a drawing showing a call center architecture 2100 of the present invention. Architecture 2100 contains a network provider call center 2102 and a customer call center 2104. Network provider call center 2102 is maintained by an operator of a public-switched telephone network (PSTN) 2105. Customer call center 2104 is linked to PSTN 2105 by a telephone link 2106. Customer call center 2104 is also optionally linked to provider call center 2102 by a data connector 2172. In this architecture, most of the equipments associated with the implementation of a call center are preferably located at provider call center 2102 while the agents are preferably located at customer call center 2104.

Network provider call center 2102 provides call center services to other customers, such as customer call center 2108. These call centers are linked to PSTN 2105 by telephone links. For example, customer call center 2108 is linked to PSTN 2105 by telephone link 2109. Further, customer call center 2108 is optionally connected to provider call center 2102 by a data connector 2174.

In order to illustrate the operation of the present invention, the system in FIG. 10 is used to perform predictive dialing. In this case, agents in customer call center 2104 want to contact potential buyers of a product or service. The telephone numbers of these potential buyers are stored in a database in provider call center 2102. Equipments in provider call center 2102 dial these telephone numbers. If a telephone number is busy, another telephone number is dialed automatically. When a potential buyer answers the call, the call is immediately routed to an available agent in customer call center 104. The agent can then talk to the buyer regarding the product or service.

Customer call center 2104 comprises a private branch exchange and/or automatic call distributor (shown in FIG. 10 as PBX 2152) and a plurality of stations, such as stations 22154 and 2156. Each station has a telephone (such as telephones 2158 and 2160 in stations 2154 and 2156, respectively) and a computer (such as computers 2159 and 2161). The telephones are connected to PBX 2152. The computers are connected to a local area network 2166, which is in turn connected to data connector 2172. Agents in customer call center 2104 are assigned to these stations to operate the telephones provided therein.

Provider call center 2102 comprises a network switch 2110, a CTI system 2112 and a computer predictive dialer 2114. Network switch 2110 contains circuits that can provide switching and call distribution functions. Network switch 2110 is coupled to a high bandwidth telephone line 2116 so that a plurality of telephone channels are available for connecting to the telephones of potential buyers. Network switch 2110 also contains means for keeping an incoming call connected thereto continuously so that this incoming call can be routed at will to any lines controlled by network switch 2110 (referred herein as the "continuous connection" function). Network switches made by some manufacturers contain this means. For those network switches that do not contain this means, a "looped around" circuit 2120 can be used to provide the same continuous connection functionality. Looped around circuit 2120 comprises a pair of station trunks 2122 and 2124 in a network switch that Aare physically connected together. This arrangement allows an incoming call (originated from an agent in a customer call center) terminated at one of the station trunks, such as station trunk 2122, to be continuously connected to network switch 2110, as long as the call is not disconnected by the caller (i.e., the agent) who initiated the call. The means for keeping incoming calls connected and the looped around circuit are collectively called the "continuous connection means." During the time the incoming call is connected to continuous connection means, network switch 2110 can communicate with the caller (i.e., the agent) at any time without the need to reestablish the telephone connection.

FIG. 10 shows the structure of CTI system 2112. It contains a CTI-server 2132, a stat-server 2134, a routing server 2136 and a database server 2138. Stat-server 2134 contains a database for storing all relevant activities of CTI system 2112 (e.g., the current status and history of all calls in CTI system 2112). Database server 2138 contains information of customer call center 2104, such as information on various agents who work in customer call center 2104. Routing server 2136 routes calls to appropriate stations in customer call center 2104 based on factors such as the information contained in stat-server 2134 and the status of various stations in customer call center 2104. CTI-server 2132, stat-server 2134, routing server 2136 and database server 2138 are connected by a data communication network 2140. Data connectors 2172 and 2174 connect data communication network 2140 to the local area networks in customer call centers 2104 and 2108, respectively (such as local area network 2166 in center 2104).

CTI server 2132 acts as a bridge between network switch 2110 at one end and stat-server 2134 and routing server 2136 at the other end. CTI server 2132 is designed to interface with network switches manufactured by different vendors and present a uniform application program interface (API) to stat-server 2134 and routing server 2136. An advantage of this arrangement is that individual components in provider call station 2102 could be replaced and enhanced separately. For example, substantially the same routing server and stat-server could be used with network switches from different manufacturers (e.g., AT&T, Northern Telecom or Ericsson) by changing CTI server 2132. Specifically, different versions of a particular implementation of CTI server 2132 can be designed to match with switches made by different manufacturers (provided that the switches have a CTI link). These versions communicate with the same routing server, database server and stat-server through a standard protocol which is switch-independent.

In operation, when an agent begins work at one of the stations in customer call center 2104, such as station 2154, he dials a predetermined telephone number which terminates at network switch 2110. When network switch 2110 receives this call, it connect the call to the continuous connection means. For the network switches that contains loop around circuit 2120, the call is connected to station trunk 2122. As a result, telephone 2158 in station 2154 is connected to network switch 2110 until the agent terminates the call. The agent can also send his identification number and other information to routing server 2136 using telephone 2158 or computer 2159. At this time, CTI system 2112 knows that station 2154 is now in operation and the identity of the agent in station 2154. CTI system 2112 can route calls to this station. Other agents can log on to the system using the same method.

In order to illustrate an application of the present invention, predictive dialing using call center architecture 2100 is described. When predictive dialing starts, CPD 2114 causes network switch 2110 to dial telephone numbers from its list. CPD 2114 can be a software comprising a list manager (for managing a list of phone numbers to be dialed) and a dialer application. CPD 2114 is connected to data communication network 2140. When a connection to a potential buyer is established, network switch 2110 passes this information to CTI system 2112, which routes the call to one of the agents in customer call center 2104. Because telephone connections between provider call center 2102 and the agents have previously been established, network switch 2110 can immediately connect the call to the selected agent. As a result, there is little delay in establishing communication between the agent and the buyer.

An important advantage of the present invention is that all call center features are centralized. As pointed out above, database server 2138 and stat-server 2134 contains information of the activities, users and agents of the call center. This information will be centrally available. Routing server 2136 can centrally control the operation of the entire system (which includes provider call center 2102 and all the customer call centers) and route calls to the most qualified agent to service a call.

Figure 11:
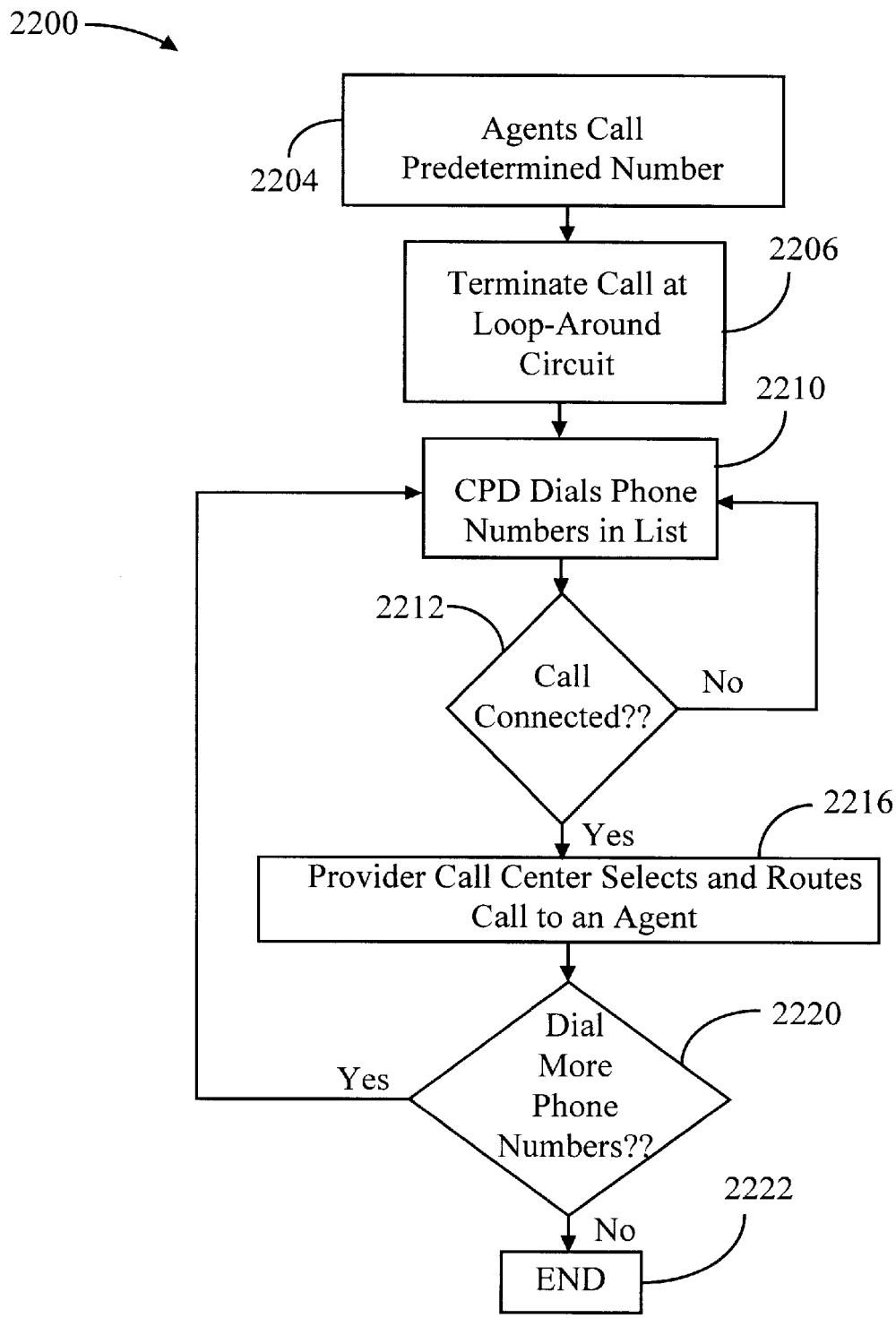
FIG. 11 is a flow chart showing an embodiment of the present invention.

FIG. 11 is a flow chart 2200 showing the operation of the system shown in FIG. 10. In step 2204, the agents in customer call center 2104 call the predetermined number to provider call center 2102. In step 2206, the call terminates at the means for continuously connecting an incoming call (such as loop around circuit 22120). At step 2210, CPD 2114 dials phone numbers in a list. It determines whether a call is connected (step 2212). If the answer is negative (i.e., the call not connected), flow chart 2200 branches back to step 2210 and another phone number from the list is selected for dialing. If the answer is positive, the software in provider call center 2102 selects an appropriate agent to take the call. The call is routed to the selected agent (step 2216). CPD 2114 determines whether other phone numbers in the list need to be called (step 2220). If more numbers need to be called, flow chart 2250 branches back to step 2210, and the phone numbers are dialed. If no more phone numbers in the list needs to be called, flow chart 2200 terminates (step 2222).

It should be appreciated that the above described operation can be applied to other customer call centers. Also, other services, in addition to predictive dialing, can also be performed by network provider call center 2102. For example, the present invention can also be used by provider call center 2102 to process all inbound calls of the customer call centers. In this situation, the delay in establishing communication between agents and callers may not be an overly important problem. However, the ability to centralized information and operation remain an important advantage of the present invention over the prior art.

It should also be appreciated that even though CTI server 2132, routing server 2136, stat-server 2134 and database server 2138 are shown as separate components, they could be combined into one, two or three components residing on one or more data processing devices. In one embodiment of the present invention, they are implemented as a client/server architecture, and they can be geographically separated.

In addition to customer call centers, individual stations can also use the service of the network call center. As an example, FIG. 10 shows a station 2180 having a telephone 2182 and a computer 2184. Phone 2182 is connected to PSTN 2105 via line 2186 and computer 2184 is connected to data communication network 2140 via data connector 2188. In operation, an agent in station 2180 dials a predetermined telephone number which terminates at network switch 2110. Switch 2110 then connects this call to station trunk 2122. As a result, telephone 2182 is connected to network switch 2110 until the agent terminates the call. Consequently, the equipment and software in provider call center 2102 are available to station 2180.

The present invention can also be applied to multiple network call centers. The data communication networks in these network call centers (such as network 2140 of FIG. 10) are connected to each other by a high speed data connector. The network switches of these call centers are connected to each other using reserved telephone connections. As a result, telephone calls can be routed from one call center to another without undue delay. System and Method for Operating a Plurality of Call Centers (3220) The present invention comprises a novel call center architecture and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 12:
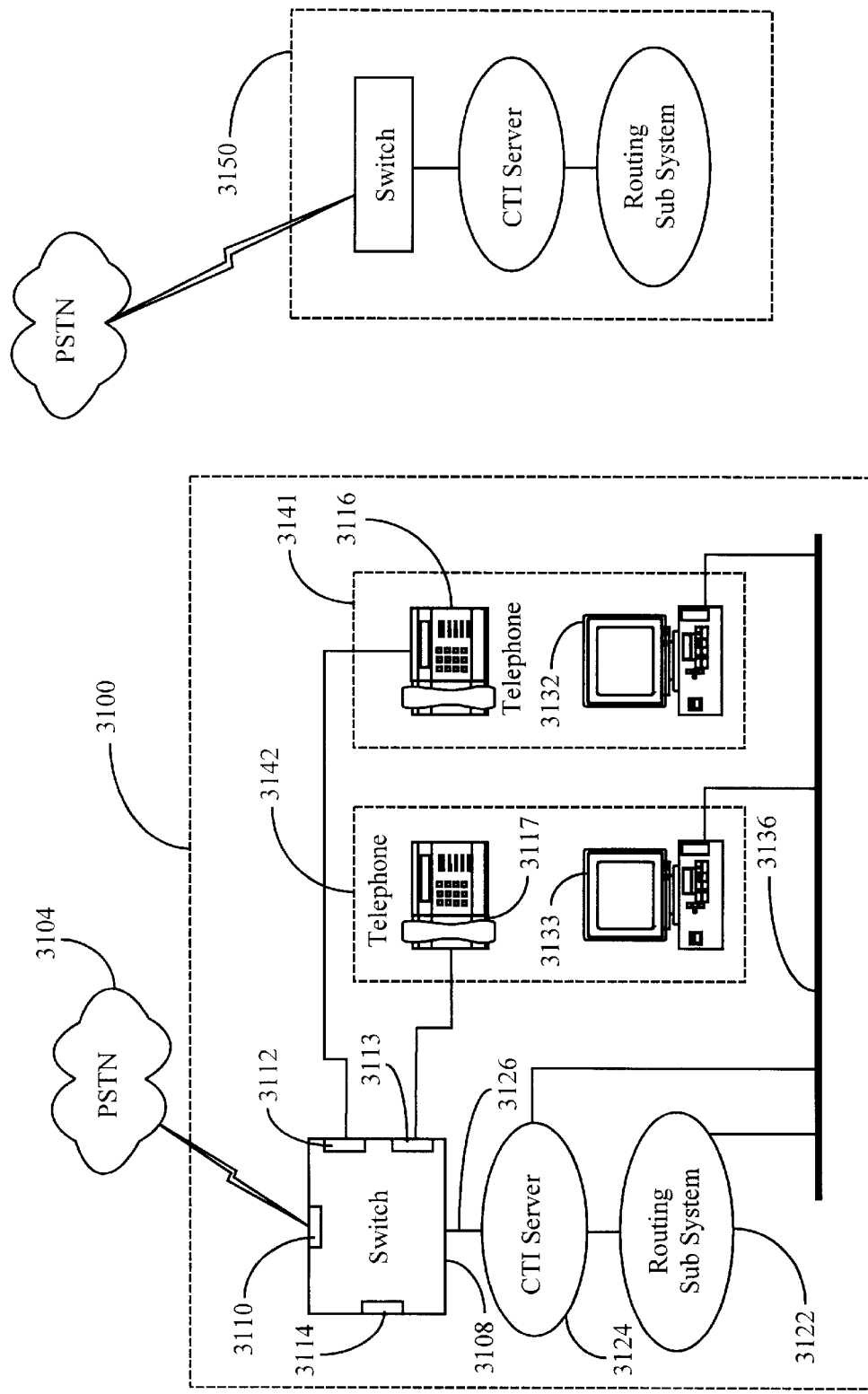
FIG. 12 is a block diagram of a prior art call center architecture.

FIG. 12 shows a schematic diagram of a prior art system having call centers in separate geographic locations. As explained below, the operations of these call centers are not integrated, thereby leading to inefficient use of resources.

FIG. 12 shows two call centers 3100 and 3150 out of a plurality of call centers. Because the structure of these call centers are similar, only one of them (center 3100) will be described in detail. Call center 3100 is connected to a public-switched telephone network (PSTN) 1304. It comprises a switch 3108 for accepting calls from PSTN 3104. Switch 3108 could be an automatic call distributor (ACD)/ private branch exchange (PBX) or a PSTN switch. Switch 3108 contains a high bandwidth port 3110 (for connecting to PSTN 33104) and a plurality of low bandwidth ports (such as ports 3112–3114). Some of these low bandwidth ports can be connected to voice-based devices. For example, ports 3112–3113 is connected to telephones 3116–3117, respectively. Agents are assigned to handle these telephones. Each of the low bandwidth ports is assigned one or more directory numbers (DN").

It has been found that the function performed by a standard switch is rather limited and cannot meet the requirements of a typical call center. For example, it is desirable to provide information about a call to a workstation (such as workstation 3132–3133) available to each agent. The telephone and a corresponding workstation form an integral unit (such as units 3141 and 3142) to serve a call. However, a switch cannot search, process and route data to these workstations. Consequently, a new technology, called computer-telephony-integration (CTI), is needed to route a combination of voice and digital data to desired places.

As a way to implement CTI, call center 3100 further contains a routing subsystem 3122 connected to a CTI server 3124, which is in turn connected to switch 3108 through a CTI link 3126. The communication between switch 3108 and server 3124 typically follows the X.25 protocol. CTI server 3124 can be considered an interfacing software which allows routing subsystem 3122 to interact in a consistent manner with switch 3108 (which may be made by one of several vendors). Switch 3108 notifies CTI server 3124 when a call is received. CTI server 3124 sends the information to routing routine 3122, which selects an agent best qualified to answer the call in accordance with predetermined criteria. CTI server 3124 then notifies switch 3108 to direct the call to the telephone of the selected agent while routing subsystem 3122 directs data relating to the person placing the call to the workstation of the selected agent.

In order to facilitate data communication, a communication network 3136 is used to digitally connect routing subsystem 3122, CTI server 3124 and workstation's 3132–3133.

As can be seen in FIG. 12, prior art call centers contain separate switch, CTI servers, and routing subsystems. The problem with this architecture is that routing can only be performed locally. Thus, even if there is an agent best suitable to handle a call, the call cannot be routed to this agent if he/she is located in another call center.

Figure 13:
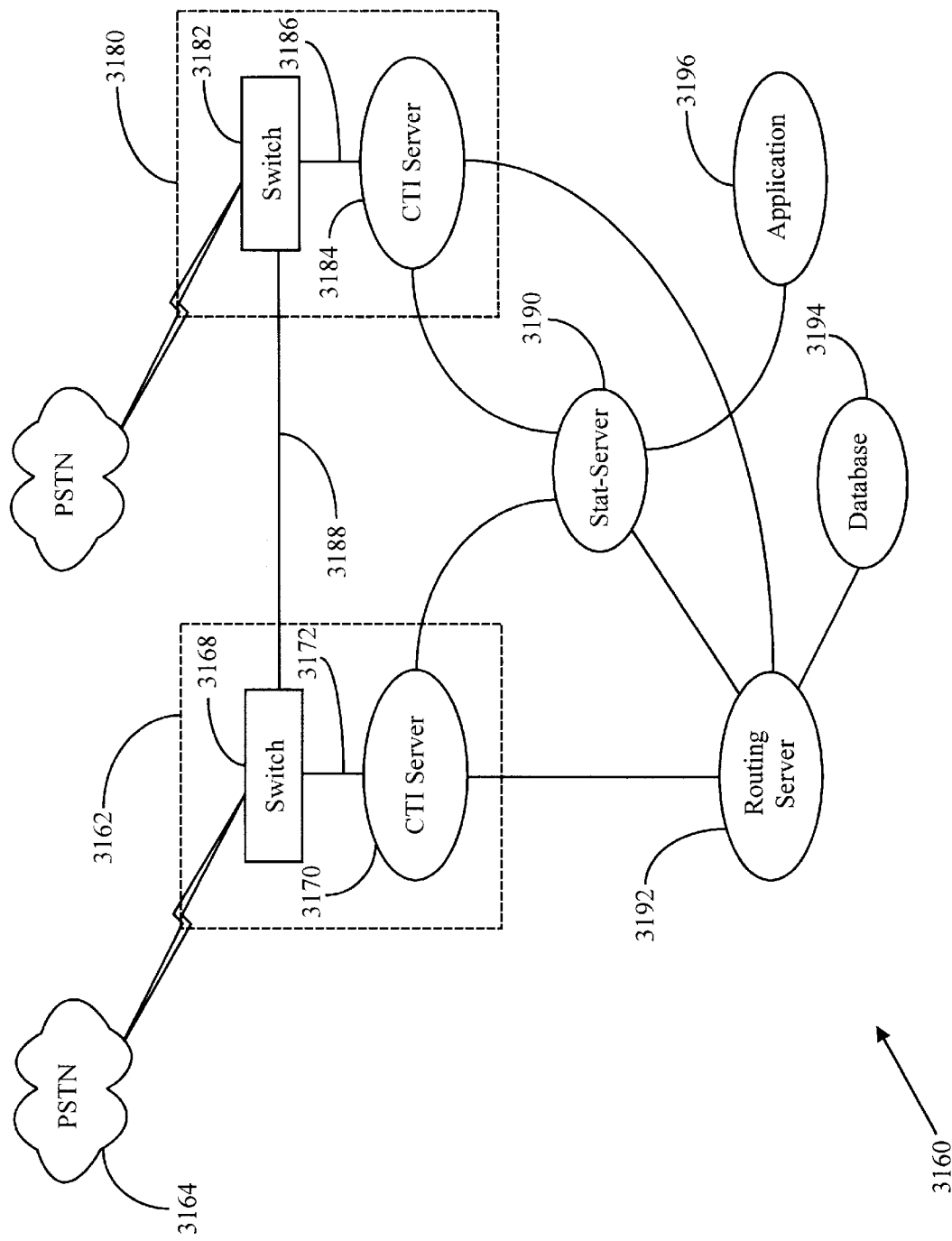
FIG. 13 is a block diagram of a multiple call center's architecture of the present invention.

FIG. 13 is a schematic diagram showing a global call center architecture 3160 in accordance with the present invention. This architecture allows routing of calls received by one call center to an agent located in a geographically separated call center. Digital data related to the calls (e.g., customer and ordering information related to telephones which originate the calls) is also routed to the agent. As a result, the resources of these call centers can be better utilized.

As an example to illustrate the advantages of the global call center architecture, a call center may be temporarily swamped with calls, and thus need to direct calls to other call centers that are relatively quiet. The global call center architecture of the present invention can direct the calls to an appropriate agent in another call center, thereby fully utilizing the resources of the call centers.

Another advantage of the present architecture is that it allows different call centers to maintain specialized resources. There are good reasons why specialized resources can be better acquired by different call centers. For example, call centers that are close to universities or high-tech areas would be in a better position to hire agents who can provide technical information to customers. Similarly, call centers located in metropolitan areas around the coastal areas would be in a better position to hire agents having foreign language skills. Thus, calls which require these specialized resources but initially received by a call center located away from the above-mentioned areas are likely to find the best qualified agent located in one of these call centers. The present inventions allow these calls to be routed to the best qualified agent in these specialized call centers.

Yet another advantage of the architecture shown in FIG. 13 is that all the information can be centrally managed. As a result, the information in a database can be easily updated and maintained. In contrast, if each call center maintains its own database, it would be difficult to enforce data integrity.

FIG. 13 shows two call centers 3162 and 3180 out of a plurality of call centers. The structure of only one call center (center 3162) is described in 10 detail here because all the call centers have similar structure. Call center 3162 contains a switch 3168 that is similar to the switch 3108 of FIG. 12. Switching 3168 could be an automatic call distributor (ACD)/private branch exchange (PBX) or a PSTN switch. Switch 3168 contains a high bandwidth port (not shown) for connecting to a PSTN 3164 and a plurality of low bandwidth ports (not shown) for connecting to voice-based devices (such as telephones). Agents are assigned to handle these telephones. Each of the low bandwidth ports is assigned one or more directory numbers. Agents are also provided with workstations (not shown) for displaying callers (and other) information.

Call center 3162 contains a CTI server 3170 that is connected to switch 3168 through a CTI-link 3172. Up to this point, call center 3162 is similar to call center 3100 of FIG. 12. However, in the present architecture, the routing subsystem is not considered part of the call center.

Similarly, call center 3180 contains a switch 3182 and a CTI server 3184 linked by a CTI-link 3186. Switches 3168 and 3182 in call centers 3162 and 3180, respectively, are connected by a tie line 3188.

It should be noted that switch 3168 and CTI server 3170 do not have to be located in the same physical area. The present invention does not impose any condition on the length of CTI link 3172.

Global call center 3160 contains a single stat-server 3190 to gather statistical information of all the call centers. It also contains a routing server 3192 for selecting appropriate agents using data in stat-server 3190 (and from other databases). Stat-server 3190 collects and stores historic data relating to all calls, activities of switches, and information and activities of all agents and telephones in all the call centers.

One aspect of the present invention is a three-layer architecture in which a first layer comprises a plurality of switches and their matching CTI servers. The switches could be manufactured by different vendors. Each switch has a different capability and interface procedure. The matching CTI server is a routine which communicates and controls an associated switch one hand and, at the other hand, presents a common interface to the second and third layers. The second layer communicates with all the CTI servers in the first layer and all applications in the third layer. The third layer contains one or more applications which use the information contained in the second layer. In this embodiment, the second layer accumulates statistics on all aspects of the operation of the call centers, such as the agents and all activities of the automatic call distributors. The second layer provides this statistics to various applications in the third layer.

In a preferred embodiment, various entities in a call center are associated with software objects. The following are some examples of these objects:

(a) Queues and Routing Points: These are hardware circuits in switches and are represented as objects. Queue implements hardware controlled ACD mechanism. Routing points, sometimes called control directory number (CDN), can be controlled by external software applications (such as a routing routine).

(b) Agent DNs: They are hardware ports in a switch and are represented as objects. Each DN is associated with one or more properties. For example, some DNs can access another DN directly; some DNs are associated with queues; some DNs are limited to outgoing calls; and some DNs have a period of unavailability after completion of a previous call. In a specific example, some of the switches manufactured by Northern Telecom contain basically two kinds of DNs, position and extension. Extension DNs can be accessed directly by a telephone and can initiate outgoing calls. Position DNs are associated with one or more queues. They can be accessed only through these queues and cannot initiate outgoing calls.

(c) Agent Places: They are logical spaces each containing items associated with the space (e.g., one or more DNs, possibly attached to different switches, and workstations). In a physical implementation, these places could be desks. When an agent makes login to one item in a place, he (she) becomes logically logged in for the whole place. Each place is represented as an object and associated with a PlaceID.

(d) Agents: Persons (objects) identified by an AgentID. Agents can move between places dynamically. The stat-server has a special routine for dynamically keeping track of the locations of all the agents. For example, an agent can work from 9:00 A.M. till 13:00 (i.e., 1:00 P.M.) at a first place; makes a logout (e.g., for lunch) and then makes a login at a second place at 14:00. The agent location tracking routine maintains the information so that the routing server (and other applications) knows which DN to dial to reach the agent. Each agent may also have a "home place," which is a default value if the agent cannot be dynamically tracked.

(e) Groups: A number of agents in any combination. Group objects are identified by GroupIDs. There are at least two types of groups. The first type (identified herein as SObjectGroupAgents) contains a list of AgentIDs. In this case, the stat-server tracks all agent movements and collect statistics only for included agents.

Examples are groups with particular skills. The second type (identified herein as SObjectGroupPlaces) contains a list of agent places (PlaceIDs). Examples of places in the lists are training room, main office, second floor, etc. In this case, the stat-server tracks events related to places included in the list because it does not matter who works in these places.

Figure 14:
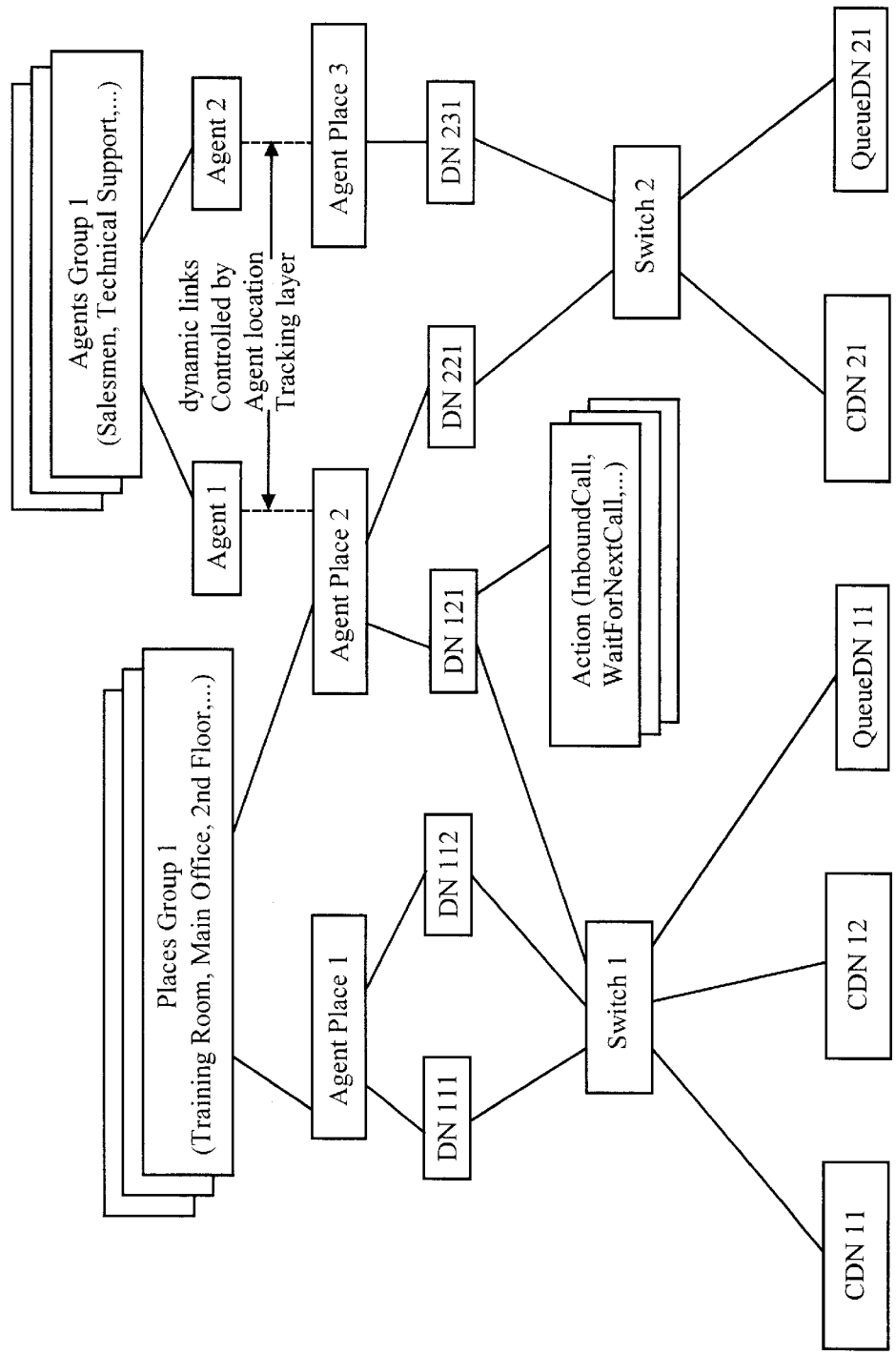
FIG. 14 is a schematic diagram showing illustrating objects used in a stat-server of the multiple call centers system of the present invention.

FIG. 14 is used to illustrate the above described objects. It shows two switch objects 3212 and 3213, one represents switch 3168 and the other represents switch 3182. Switch object 3212 comprises the following resources: CDN objects 3214 and 3215, queueDN object 3216, and DN objects 3217–3219. These objects represent the corresponding CDN, queues, and agent DNs in switch 3168. Similarly, switch object 3213 comprises the following resources: CDN object 3221, queueDN object 3222, and DN objects 3223–3224. These objects represent the corresponding CDN, queues, and agent DNs in switch 3182.

The agent DN objects 3217–3219 and 3223–3224 are also included in agent place objects. In this example, agent place object 3226 includes DN objects 3217 and 3218, agent place object 3227 includes DN objects 3219 and 3223, and agent place object 3228 includes DN object 3224. It should be noted that the DNs from two different switches can be associated with the same agent place.

Some of the agent place objects can be grouped together to form place group objects. In FIG. 14, only one place group object 3232 is shown.

FIG. 14 also shows a plurality of agent objects, such as objects 3230 and 3231. In this example, agent object 3230 is dynamically linked to agent place object 3227 using the above mentioned agent location tracking routine, shown in FIG. 14 as a dashed line 3235. Similarly, agent object 3231 is dynamically linked to agent place object 3228 using an agent location tracking layer, shown as a dashed line 3236.

Some of the agent objects can be grouped into agent group objects. In FIG. 14, only one agent group object 3233 is shown.

Stat-server 3190 provides a set of application programming interfaces (APIs) for its clients to obtain statistics for various objects, such as objects associated with agents, agent groups, places, place groups, route points, queues, etc. Statistics could be current objects states representation (e.g., current agent status, current number of active calls in a group, etc.) or historical states representation. Historical representation are accumulated information for certain time intervals (e.g., total number of calls, total talk time, average talk time, etc.). Thus, the clients have to specify the time interval of interest. Examples of time intervals are:

(a) SFixedStartSlidingEnd: The start time is fixed (e.g., 9:00 A.M.) while the end time is sliding (e.g., "till now"). For example, the client may request the total number of calls between 9:00 A.M. and now.

(b) SFixedStartFixedEnd: Both the start and end times are fixed.

(c) SFixedLengthSlidingEnd: The time interval is fixed while the start and end times are sliding. Example: the average call length for the past hour.

Global call center 3160 also contains a routing server 3192 for selecting agents and places and causing the switches to route calls thereto. Routing server 3192 requests statistical information on objects of interest from stat-server 3190. Routing server 3192 also has access to a separate database 3194 containing other relevant information, such as information relating to customers and agents in all the call centers in global call center 3160. Using information from stat-server 3190 and database 3194, routing server 3192 selects (using a software algorithm) the best agent for a specific call.

As explained in FIG. 14, the statistics of many objects are tracked by stat-server 1390. One of the reasons for creating these objects is that routing server 3192 typically requests information in the form of agents, agent groups, agent places and place groups. On the other hand, the CTI server sends to stat-server 3190 information about DNs and CDNs of their associated switches.

These objects allow stat-server 3190 to easily communicate with various clients that can access it.

Figure 15A:
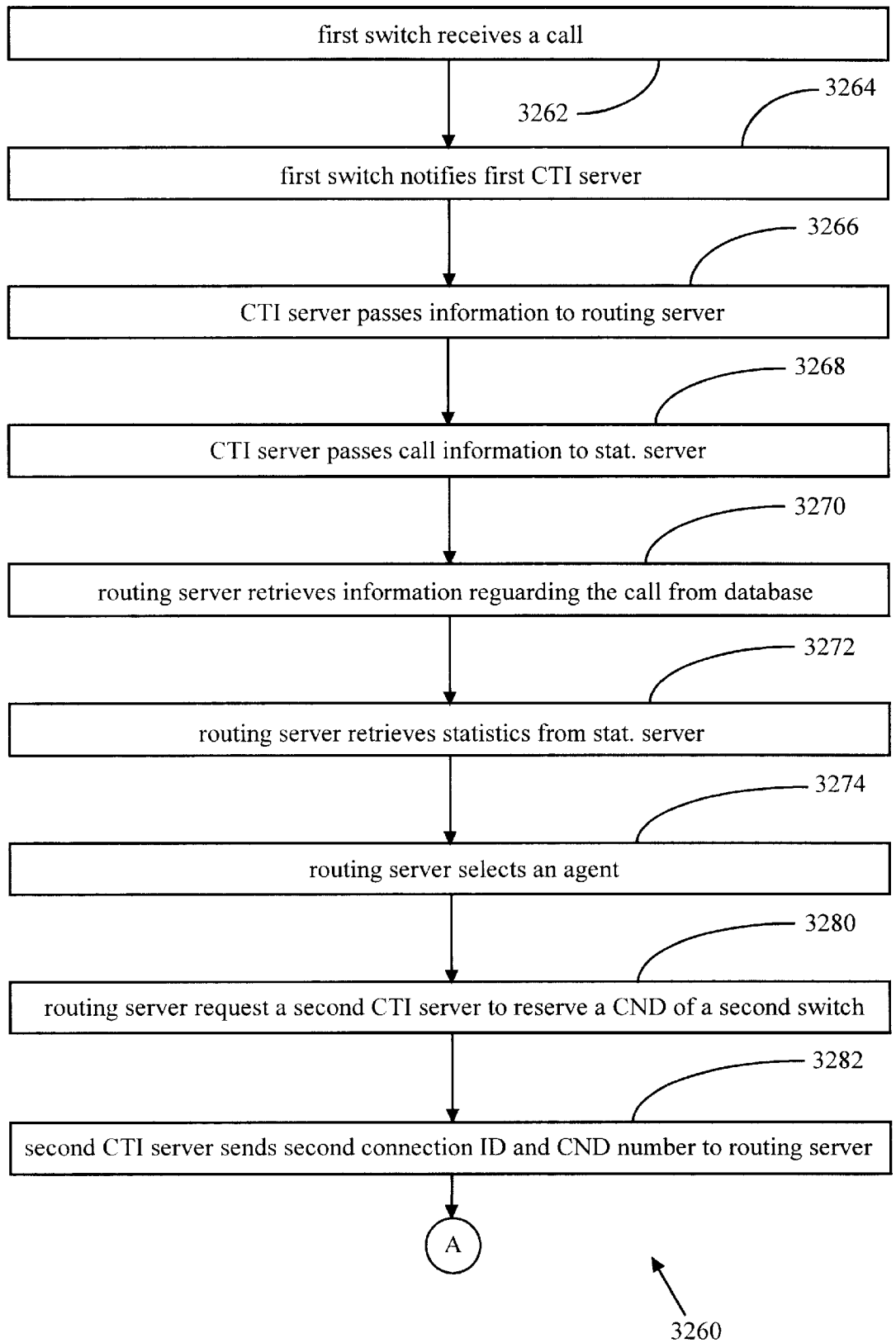
FIGS. 15A and 15B (in combination) is a flow diagram showing the operation of a multiple call centers system in accordance with the present invention.
Figure 15B:
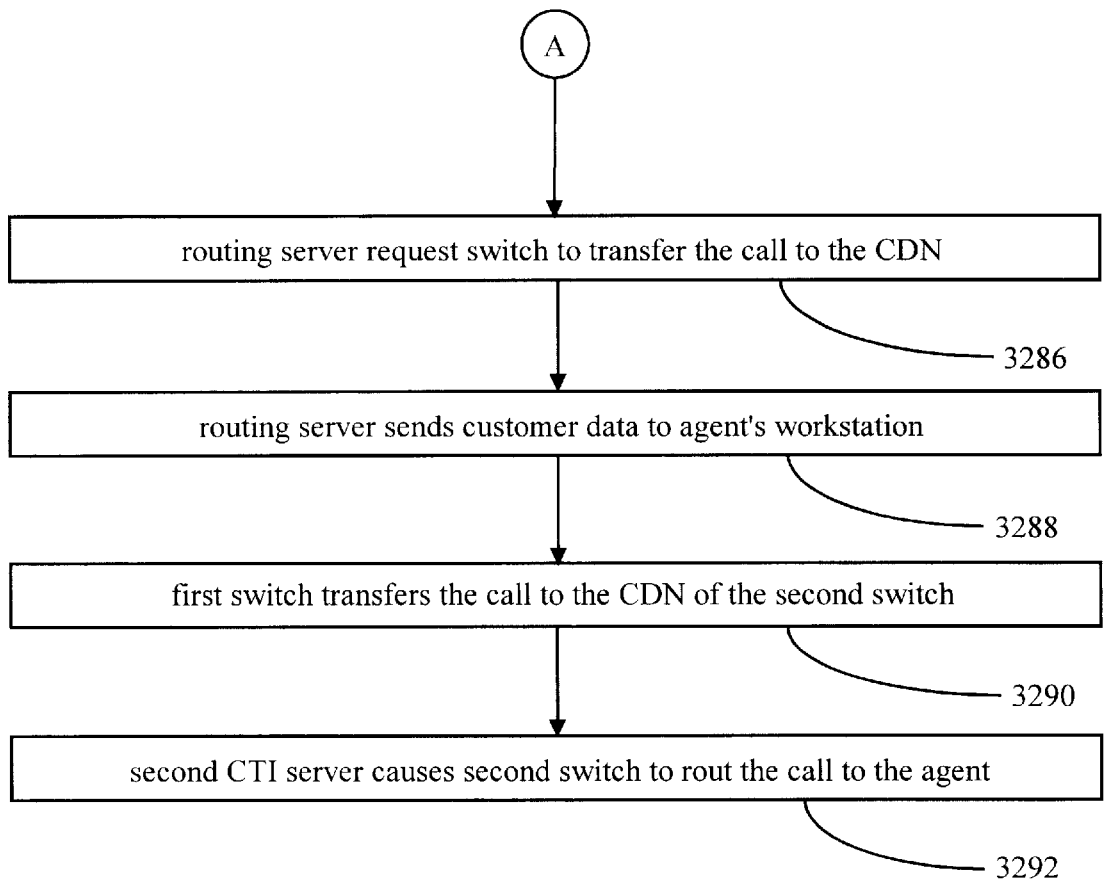

The operation of global call center 3160 is now described using a flow chart 3260. FIGS. 15A and 15B is used to illustrate the flow chart. In this example, it is assumed that a call is received by a CDN of switch 3168 (step 3262) of call center 3162 while the best suitable agent is located in call center 3180. Instead of routing the call itself, switch 3168 notifies CTI-server 3170 of this event (step 3264). CTI server 3170 assigns a unique connection identification to this call (call herein as the first connection ID, for convenience), and pass this ID together with other information about this call, such as its "automatic number identification" (ANI) and (if applicable) "dial number identification system" (DNIS), to routing server 3192 (step 3266). The ANI uniquely identifies the telephone line which originates the call while the DNIS uniquely identifies the toll-free 800-number dialed by a telephone. CTI server 3170 also notify stat-server 3190 that a call has been received (step 3268) The connection ID, ANI, DNIS and other CTI-related parameters are also passed to the stat server 3190.

Routing server 3192 then sends API commands to database 3194 to request relevant information relating to this call (step 3270). For example, if a call originates from a telephone having a certain ANI, routing server 3192 asks database 3194 to retrieve information about persons related to this telephone.

The details of a special API structure, called a "status priority table," is described in detail in a separate patent application entitled "Method and System for Determining and Using Multiple Object States in a Computer Telephony Integration System." This table allows an application to define the priority of various states of an object (e.g., the DN object). The stat-server 3190 can provide statistics to the requesting application in accordance with the predefined priority.

Assuming that the retrieved information indicates that the mother tongue of the persons is French, routing server 3192 tries to look for an agent who knows French. Routing server 3192 then request statistics of all agents who know French from stat-server 3190 (step 3274). In step 3274, routing server 3192 selects an agent based on this statistics using a predetermined criteria (e.g., how many calls have been handled by an agent, the length of time an agent has been waiting for calls, etc.).

In this example, it is assumed that the selected agent is located in call center 3180. Thus, routing server 3192 needs to (i) cause the call to be routed to an appropriate DN associated with the selected agent and (ii) route relevant customer information from database 3194 about this call to a workstation associated with the selected agent. The method for achieving the routing is described below.

In step 3280, routing server 3192 sends a command to CTI server 3184 in call center 3180 requesting reservation of a CDN in switch 3182. This CDN will be used to accept a call from switch 3168. CTI server 3184 assigns a second connection ID to this upcoming call. It then sends the CDN and second connection ID to routing server 3192 (step 3282).

Upon receiving the information, routing server 3192 sends a command to CTI server 3170 of call center 3162 to cause switch 3168 to transfer the call to the specified CDN of switch 3182 of call center 3180 (step 3286). This command includes the first connection ID, thereby allowing CTI server 3170 to associate this command with the call of interest. Routing server 3192 also sends customer information (retrieved from database 3194) to a workstation associated with the selected agent (step 3288).

Switch 3168 transfers the call to the specified CDN of switch 3182 via tie line 3188 (step 3290). Upon receiving the call, switch 3182 notifies CTI server 3184. CTI server 3184 is able to determine that this call is associated with the second connection ID because it terminates at the specified CDN. It then causes switch 3182 to route the call to the DN associated with the selected agent (step 3292). CTI server 3184 may also optionally notify routing server 3192 that routing associated with the second connection ID is completed.

As a result of the above described operations, routing server 3192 can route calls to agents located in all the call centers. Consequently, the resource of all the call centers can be fully utilized.

Method for Routing Calls to Call Centers Based on Statistical Modeling of Call Behavior (3221)

Figure 16:
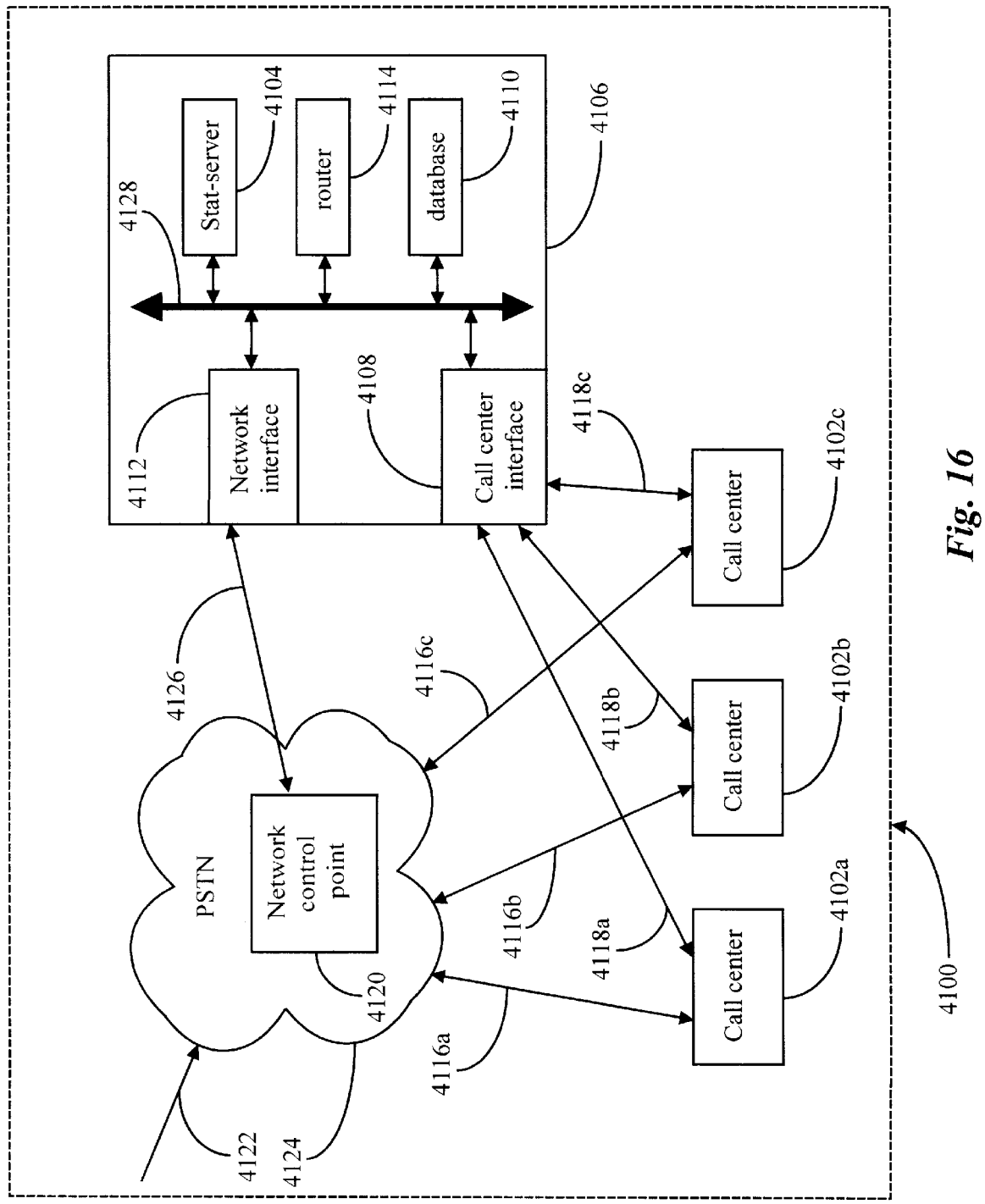
FIG. 16 is a schematic diagram of a call center system containing a central controller of the present invention.
Figure 17:
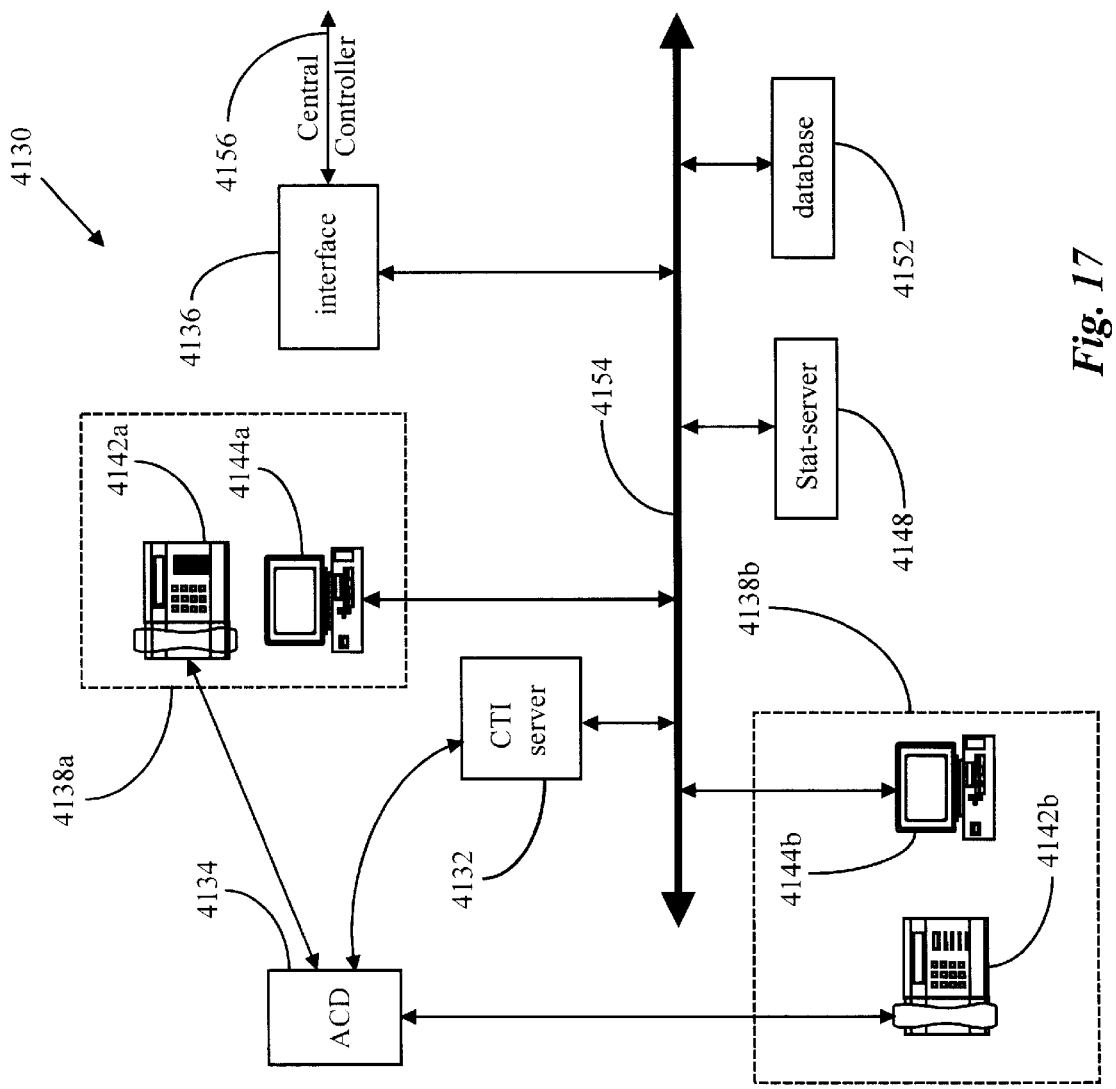
FIG. 17 is a schematic diagram of an individual call center of the present invention.

FIG. 16 is a schematic diagram of a call center system 4100 of the present invention having a plurality of call centers (such as call center 4102a, 4102b and 4102c) and a central controller 4106. Controller 4106 contains a call center interface unit 4108 for communicating with call centers 4102a, 4102b and 4102c, a stat-server 4104 for containing statistical information of all the call centers, a database 4110 for storing agent and customer information, and a router 4114 for routing calls to individual call centers in accordance with a routing algorithm. These components are connected to each other via a data bus 4128. Call center interface unit 4108 is connected to call centers 4102a, 4102b and 4102c using communication links 4118a, 4118b and 4118c.

When a caller dials a telephone number that is preassigned to call center system 4100, the call (shown as line 4122 in FIG. 16) is temporarily parked at a network control point 4120 in the public switched telephone network (PSTN) 4124. Network control point 4120 has the ability to route call 4122 to any one of the call centers 4102a, 4102b and 4102c. Upon identifying that the called telephone number is controlled by central controller 4106, network control point 4120 notifies central controller 4106 (through a network interface 4112) of the arrival of the incoming call via a communication link 4126. Router 4114 of central controller 4106 determines the optimal routing of call 4122 using information in stat-server 4104 and database 4110. The routing decision is sent to network control point 4120. Call centers 4102a, 4102b and 4102c are connected to PSTN 4124 through telephone lines 4116a, 4116b, and 4116c, respectively. As a result, call 4122 is routed to the appropriate call center.

It should be noted that the geographic location of central controller is not important for the present invention. Thus, central controller could be located inside or outside of PSTN 4124. It could also be located inside the premise of one of the call centers.

The structure of call centers 4102a, 4102b and 4102c are essentially the same. Consequently, only one of the call centers is described in detail here. FIG. if 17 is a block diagram of such a call center 4130. It contains an interface unit 4136 for communicating with central controller 4106. It also contains a CTI server 4132 which is connected to an automatic call distributor (ACD) 4134. It should be noted that a switch or private branch exchange (PBX) may be used. ACD 4134 could also be a switch. A number of agent stations (such as stations 4138a and 4138b) are located in call center 4130. Each agent station typically contains a telephone (such as 4142a and 4142b) and a computer (such as computer 4144a and 4144b). The telephones are connected to ACD 4134 and the computers are connected to a data bus 4154.

After central controller 4106 determines that a call should be routed to call center 4130, network control point 4120 forwards call 4122 to ACD 4134 (or a switch or PBX). If a switch is used, the call could be routed to a routing point in the switch wherein routing is controlled by external software. At the same time, central controller 4106 instructs CTI server 4132 to route call 4122 to a selected agent station (such as 4138a). Central controller 4106 may also supply customer information to computer 4144a. Alternatively, call center 4130 may optionally contain a stat-server 4148, a database 4152 and a router (not shown). In this case, routing inside call center 4130 is performed locally. CTI server 4132, interface 4136, stat-server 4148 and database 4152 communicate with each other through bus 4132. Call center 4130 contains a number of hardware queues (e.g., ACD queues) and/or software queues maintained by the software in call center 4130.

Call center system 4100 will work optimally when central controller 4106 contains a complete set of information on all telephone traffic in system 4100. However, it is possible that the communication link between one or more call centers and central controller 4106 be broken for a brief duration. In a conventional system, central controller 4106 will no longer route calls to these detached call centers. One aspect of the present invention is the realization that the telephone traffic behavior of a call center can be statistically estimated using historic data. As a result, it is possible for central controller 4106 to determine whether the detached call centers are busy. If it is determined that the detached call centers are not busy, central controller 4106 continues to instruct network control point 4120 to route calls to these detached call centers.

One function of interface unit 4136 is to update central controller 4106 of the status of call center 4130, such as the number of agents who have left the call center, the status of each agent, etc. This information is stored in stat-server 4104 of central controller 4106. If communication link 4156 between call center 4130 and central controller 4106 becomes broken, central controller 4106 can use the status information to determine whether calls should be routed to call center 4130. Even if the link is not broken, it is preferred to estimate the status, as explained below in connection with FIG. 18.

Figure 18:
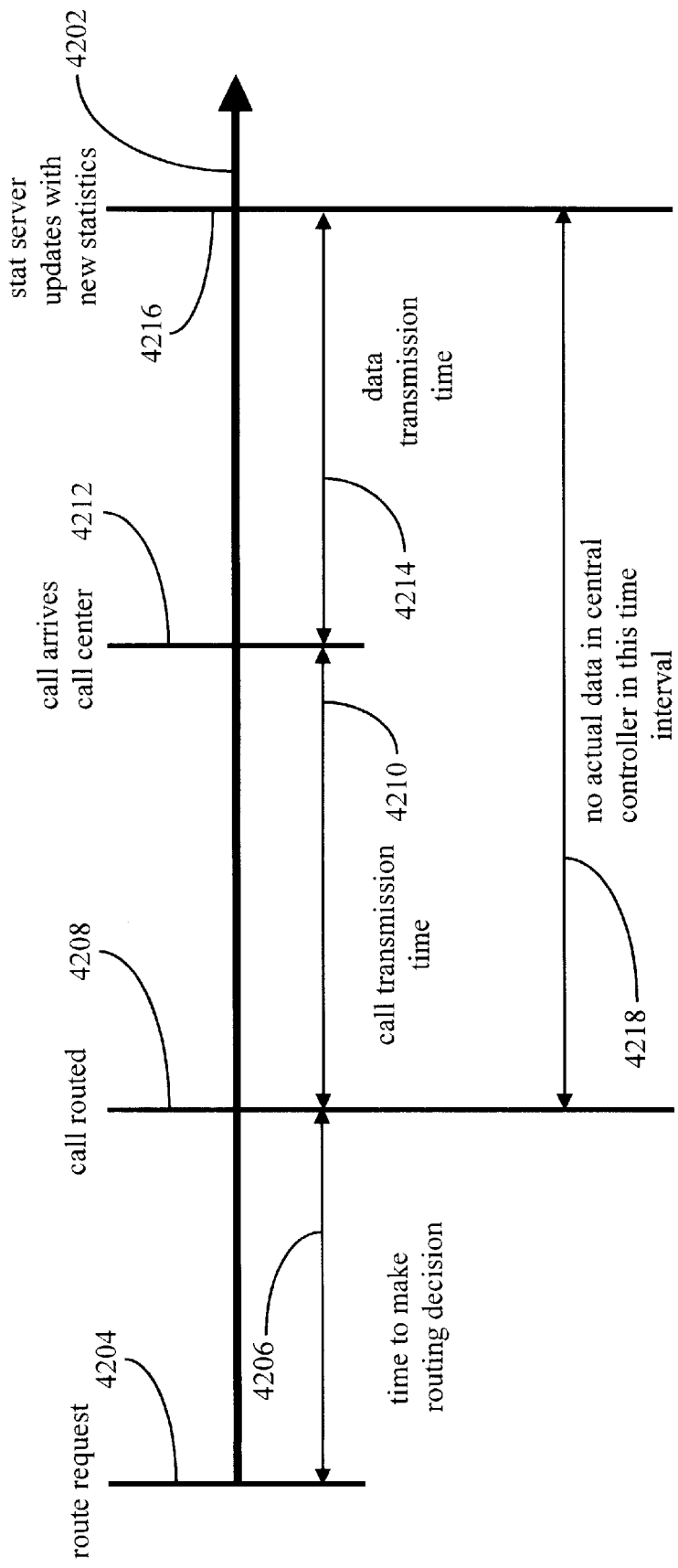
FIG. 18 is a timing diagram showing a time interval when the estimation algorithm in accordance with the present invention is needed because no actual data is available.

FIG. 18 shows a time line 4202 running in a horizontal direction. At a time indicated by a line 4204, a route request is generated because a new call has just arrived. A time interval indicated by a line 4206 is required to make a routing decision. The call is routed at a time indicated by a line 4208. It takes a time interval 4210 for the call to be transmitted to a destination call center. At a time indicated by a line 4212, the call arrives at the destination call center. The stat-server within the central controller needs a time interval (shown by a line 4214) to receive new statistical data because it takes time to pass information from the destination call center to the stat-server. At a time indicated by a line 4216, the stat-server is updated. It can be seen from FIG. 18 that no actual data is available at the central controller for a time interval indicated by a line 4218. The estimation algorithm of the present invention can be used to facilitate routing during this time interval.

There are many ways to estimate telephone traffic in a call center. An exemplary algorithm for such purpose is described below. The symbols used in the algorithm are defined first.

UT The time of the last update from the detached call center;
A The total number of agents in the detached call center;
AA The number of available agents in the detached call center;
CQ The number of calls in the queue of the detached call center;
AHT The average call handling time in the detached call center
CA The number of answered calls in the detached call center;
CC The number of completed calls in the detached call center;
AC The number of agents on call in the detached call center;
AW The number of agents in after-call work in the detached call center;
AAW The number of agents in auxiliary work in the detached call center;
OC The time of the oldest call in the queue of the detached call center;
CADD A container for adding new calls;
T The current time (i.e., time when a routing decision is made); and
BA The number of busy agents in the detached call center.

The algorithm is:

```
if ((T-UT)*min(CQ+AC+AW,A-AAW)/AHT>CQ+AC+AW) {BA=0;
    CC=CC+CQ+AC+AW; CQ=0; }
else if (CQ+AC+AW-(T-UT)*min
    (CQ+AC+AW,A-AAW)/AHT<A-AAW)
    {BA=CQ+AC+AW-(T-UT)*min
    (CQ+AC+AW,A-AAW)/AHT;
    CC=CC+(T-UT)*min
    (CQ+AC+AW,A-AAW)/AHT; CQ=0; }
else {BA=A-AAW; CC=CC+(T-UT)*min
    (CQ+AC+AW,A-AAW)/AHT;
    CQ=max(0,CQ+AC+AW-(T-UT)*min
    (CQ+AC+AW,A-AAW)/AHT-A
    +AAW);}
CA=CC+BA;
AC=min(BA,max(0,BA*CD/AHT));
AW=BA-AC;
AA=A-AAW-BA;
UT=T.
```

In the above algorithm, the term (AC+AW) corresponds to the number of agents that are currently devoted to call-processing activity. The term CQ corresponds to the number of calls that are waiting to be processed because these calls are in the queue. Assuming that one agent handles one call at a time, this term (CQ+AC+AW) could be interpreted as (a) the number of agents needed to process calls already in the call center and (b) the number of calls that are currently being processed or need to be processed. The term (A-AAW) corresponds to the number of agents that are not in auxiliary work, and are thus presumably devoted to call processing activities. The term (T-UT) is the time interval from the last update time to the current time. Consequently, (T-UT)/AHT corresponds to the number of calls that can be handled by each agent in the call center during this time period. Thus, the term (T-UT)*min(CQ+AC+AW,A-AAW)/AHT corresponds to probable number of calls being processed or need to be processed. As a result, the term under the "if" clause corresponds to the case where all incoming calls have been processed in time interval (T-UT). That is, the load is very light relative to the capability of this call center. Consequently, the number of busy agents and the number of calls in the queue are equal to zero.

The term under the "else if" clause is invoked when not all calls have been processed. However, the approximate number of unprocessed calls is less than the number of available agents. If this condition occurs, some of the agents are currently answering calls. However, there is no unanswered calls that need to be placed in the queue because there are agents available to answer the call.

When neither the conditions in the "if" or the "else if" clause are met, some calls will be placed in the queue because all available agents are busy in answering calls.

Using the above statistical model, central controller 106 can determine the capability of the detached call center to process new calls. Other information may also be needed in determining where to route a call. One piece of information is the time when the oldest call in the queue arrive ("OC"). For example, a routing strategy may not route calls to a call center where the calls in its queue has a long OC. This parameter can be estimated statistically. As an example, central controller 106 may contains a plurality of containers ("CADD"), one for each call center, for recording the time of arrival of all calls processed or to be processed by the call centers. The CADD is an internal queue, created and updated by central controller 4106 for use by this statistical modeling. One way to determine OC is to trace back from the newest call in the CADD a number of calls equal to CQ (i.e., the number of calls in the queue). Because CQ can be determined from the above statistical model, OC can also be determined from this statistical model.

Based on the above algorithm, it is possible to predict how many calls a call center can accept. Consequently, central controller 4106 may route calls to a call center even when no instantaneous data related to the call center is available.

The above statistical model can be used in the case where status data of each call centers can only be sent to central controller 4106 at pre-assigned times. In this case, this statistical model is used to estimate call behavior between the times status data is sent.

Method and Apparatus for Determining and Using Multiple Object States in a Computer Telephony Integration System (3222)

The present invention comprises novel call center method and system. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 19:
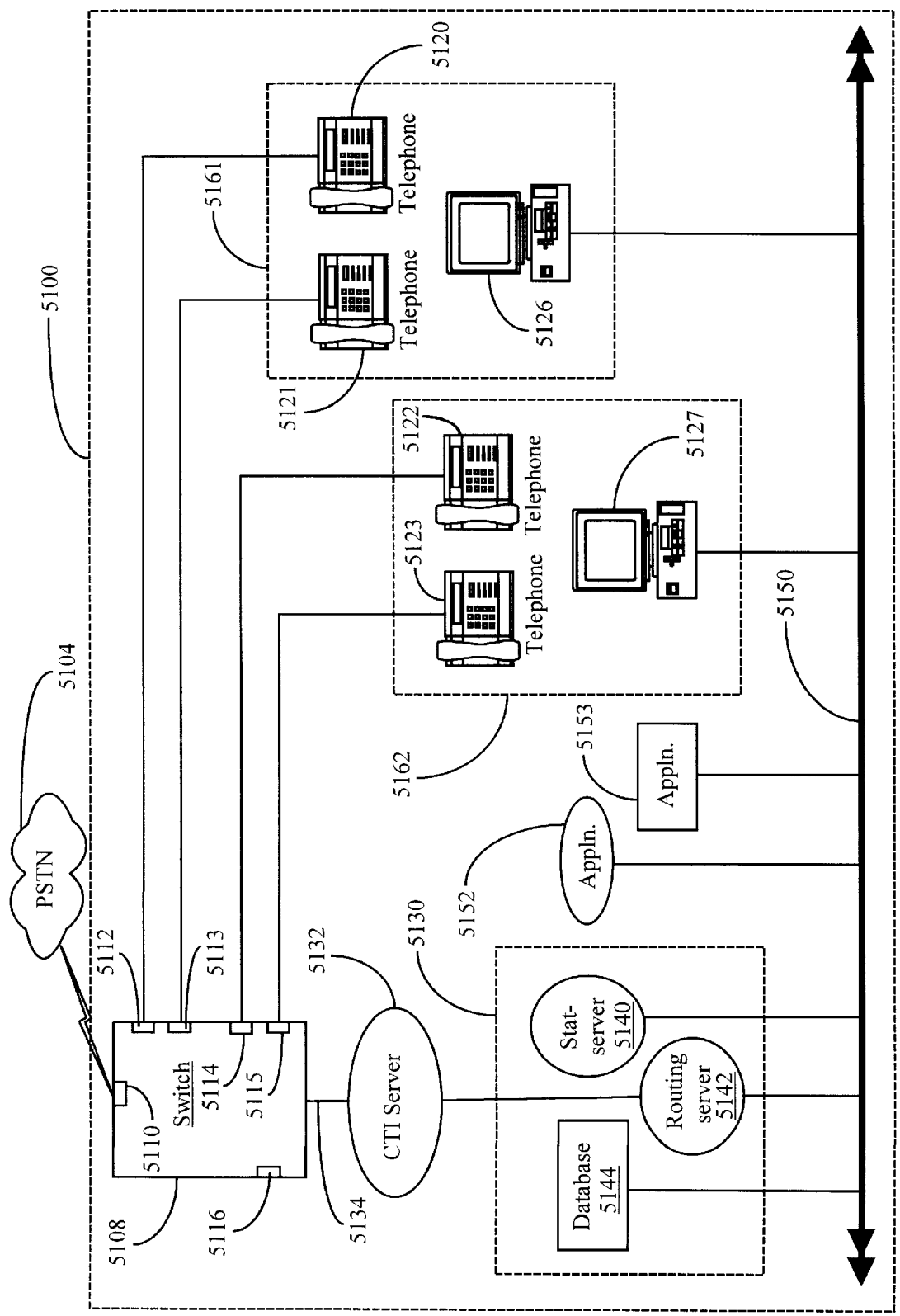
FIG. 19 is a block diagram of a call center that can implement the multiple object state determination system of the present invention.

FIG. 19 is a block diagram of a call center 5100 which can be used to implement the present invention. Call center 5100 is connected to a public-switched telephone network (PSTN) 5104. It comprises a switch 5108 for accepting calls from PSTN 5104. Switch 5108 could be an automatic call distributor (ACD)/private branch exchange (PBX) or a PSTN switch. Switch 5108 contains a high bandwidth port 5110 (for connecting to PSTN 5104) and a plurality of low bandwidth ports (such as ports 5112–5116). Some of these low bandwidth ports can be connected to voice-based devices. For example, ports 5112–5115 are connected to telephones 5120–5123, respectively. Agents are assigned to handle these telephones. Each of the low bandwidth ports is assigned one or more directory numbers ("DNs").

It has been found that the function performed by a standard switch is rather limited and cannot meet the requirements of a typical call center. For example, it is desirable to provide information about a call to a workstation (such as workstation 5126–5127) available to each agent. However, a switch cannot search, process and route data to these workstations. Consequently, a new technology, called computer-telephony-integration (CTI), is needed to route a combination of voice and digital data to desired places.

As a way to implement CTI, call center 5100 further contains a routing subsystem 5130 connected to a CTI server 5132, which is in turn connected to switch 5108 through a CTI link 5134. The communication between switch 5108 and CTI server 5132 typically follows the X.25 protocol. CTI server 5132 provides an interface between routing subsystem 5130 and switch 5108. Switch 5108 notifies CTI server 5132 when a call is received. CTI server 5132 sends the information to routing subsystem 5130, which selects an agent best qualified to answer the call in accordance with predetermined criteria. CTI server 5132 then notifies switch 5108 to direct the call to the telephone (i.e., DN) of the selected agent while routing subsystem 5130 directs data relating to the person placing the call to the workstation of the selected agent.

In one embodiment of the present invention, routing subsystem 5130 contains a stat-server 5140, a routing server 5142, and a database 5144. They communicate with one another using a data communication network 5150. Stat-server 5140 collects and stores historic data relating to all calls, activities of switches, and information and activities of all agents in call center 5100. Database 5144 contains information of customers, agents, telephone numbers, and various aspects of call center 5100. Routing server 5142 selects appropriate agents to handle calls using data in stat-server 5140 and database 5144. After the selection, routing server 5142 sends a command to CTI server 5132, which in turn instructs switch 1508 to route incoming calls to the selected agents.

There may be other CTI-related applications (i.e., software modules) which uses the resource of database 5144 and stat-server 5140 so as to provide other services or information to the agents in the call center. In FIG. 19, two applications (5152 and 5153) are shown. Examples of applications are "Agent View" and "Call Center View" marketed by Genesys Telecommunications Laboratories. These applications are connected to data communication network 5150.

In a call center, it is common for an agent to manage more than one telephone. The equipments used by an agent is usually set up in a convenient place (such as a desk), called "agent place" in the present application. FIG. 19 shows two exemplary agent places 5161 and 5162. Agent place 5161 contains a workstation 5126 and two telephones 5120 and 5121. Similarly, agent place 5162 contains a workstation 5127 and two telephones 5126 and 5127. When an agent occupies an agent place, he/she logs on using either a telephone or a workstation therein. Before the agent leaves the agent place, he/she logs out using the telephone or workstation. Consequently, call center 5100 is able to keep track of the current location of each agent.

Stat-server 5140 communicates with CTI server 5132, routing server 5142 and applications 5152–5153 via a set of application programming interface ("API") commands. Stat-server 5140 (working with CTI server 5132) can monitor and store activities of switch 5108. It also monitors and stores activities of various agents and agent places. In response to inquiry by routing server 5142 and applications 5152–5153 regarding the status of an object of interest (e.g., an agent), stat-server 5140 provides a report to routing server 5142. In an embodiment where one stat-server is used to manage several switches (which may be located in one or more call centers), stat-server 5140 monitors and stores activities of all the switches, all the agents and all the agent places served by these switches. A detailed description of a multiple call center architecture which may use the stat-server of the present invention is disclosed in a copending patent application entitled "System and Method for Operating a Plurality of Call Centers" filed Jan. 13, 1997 and assigned to the same assignee of the present application. This patent application is incorporated herein by reference.

It is observed that most call center entities (e.g., telephones and agents) could simultaneously have multiple states. For example, an agent telephone is designed to handle several activities at the same time. Thus, the agent may use the same telephone to talk to one customer, put another person (e.g., a co-worker) on hold, and waiting for an incoming call. Under prior art systems, this presents a reporting problem when the stat-server reports the state of the telephone to other CTI applications because it is not clear which state (out of several states) should be reported.

The present invention is a method and system which take advantage of the multiple states. It realizes that different CTI applications need to use state-related information differently. For example, a regular routing routine would consider an agent busy if he/she is talking on a telephone or using a workstation to enter data. However, an application which handles high priority calls (e.g., emergency calls or calls from valued customers) would consider the same agent available as long as he/she is logged on to the agent place. This is because the agent can stop working with the workstation or place a call on hold if there is an emergency phone call. Thus, the present invention allows an application to define which of the several states they wish to be informed.

An embodiment of the present invention is now described. In this embodiment, various entities in a call center are associated with software objects. The following are some examples of these objects:

(a) Queues and Routing Points: These are hardware circuits in switches and are represented as objects. Queue implements hardware controlled ACD mechanism. Routing point, sometimes called control directory number ("CDN"), can be controlled by software applications (such as a routing routine).

(b) Agent DNs: They are hardware ports in a switch and are represented as objects. Each DN is associated with one or more properties. For example, some DNs can access another DN directly; some DNs are associated with queues; some DNs are limited to outgoing calls; and some DNs have a period of unavailability after completion of a previous call. In a specific example, some of the switches manufactured by Northern Telecom contain basically two kinds of DNs, position and extension. Extension DNs can be accessed directly by a telephone and can initiate outgoing calls. Position DNs are associated with one or more queues. They can be accessed only through these queues and cannot initiate outgoing calls.

(c) Other specific DNs: They are DNs connected to specific devices, such as voice mail systems, interactive voice response units, etc. These DNs are represented as objects.

(d) Agent Places: They are logical spaces each containing items associated with the space (e.g., one or more DNs, possibly attached to different switches, and workstations). In a physical implementation, these places could be desks. When an agent makes login to one item in a place, he (she) becomes logically logged in for the whole place. Each place is represented as an object and associated with a PlaceID.

(e) Agents: Persons (objects) identified by an AgentID. Agents can move between places dynamically. The stat-server has a special routine for dynamically keeping track of the locations of all the agents. For example. an agent can work from 9:00 AM till 13:00 (i.e., 1:00 PM) at a first place; makes a logout (e.g., for lunch) and then makes a login at a second place at 14:00. The agent location tracking routine maintains the information so that the routing server (and other applications) knows which DN to dial to reach the agent. Each agent may also have a "home place," which is a default value if the agent cannot be dynamically tracked.

(f) Groups: A number of agents in any combination. Group objects are identified by GroupIDs. There are at least two types of groups. The first type (identified herein as SObjectGroupAgents) contains a list of AgentIDs. In this case, the stat-server tracks all agent movements and collect statistics only for included agents. Examples are groups with particular skills. The second type (identified herein as SObjectGroupPlaces) contains a list of agent places (PlaceIDs). Examples of places in the lists are training room, main office, second floor, etc. In this case, the stat-server tracks events related to places included in the list because it does not matter who works in these places.

Figure 20:
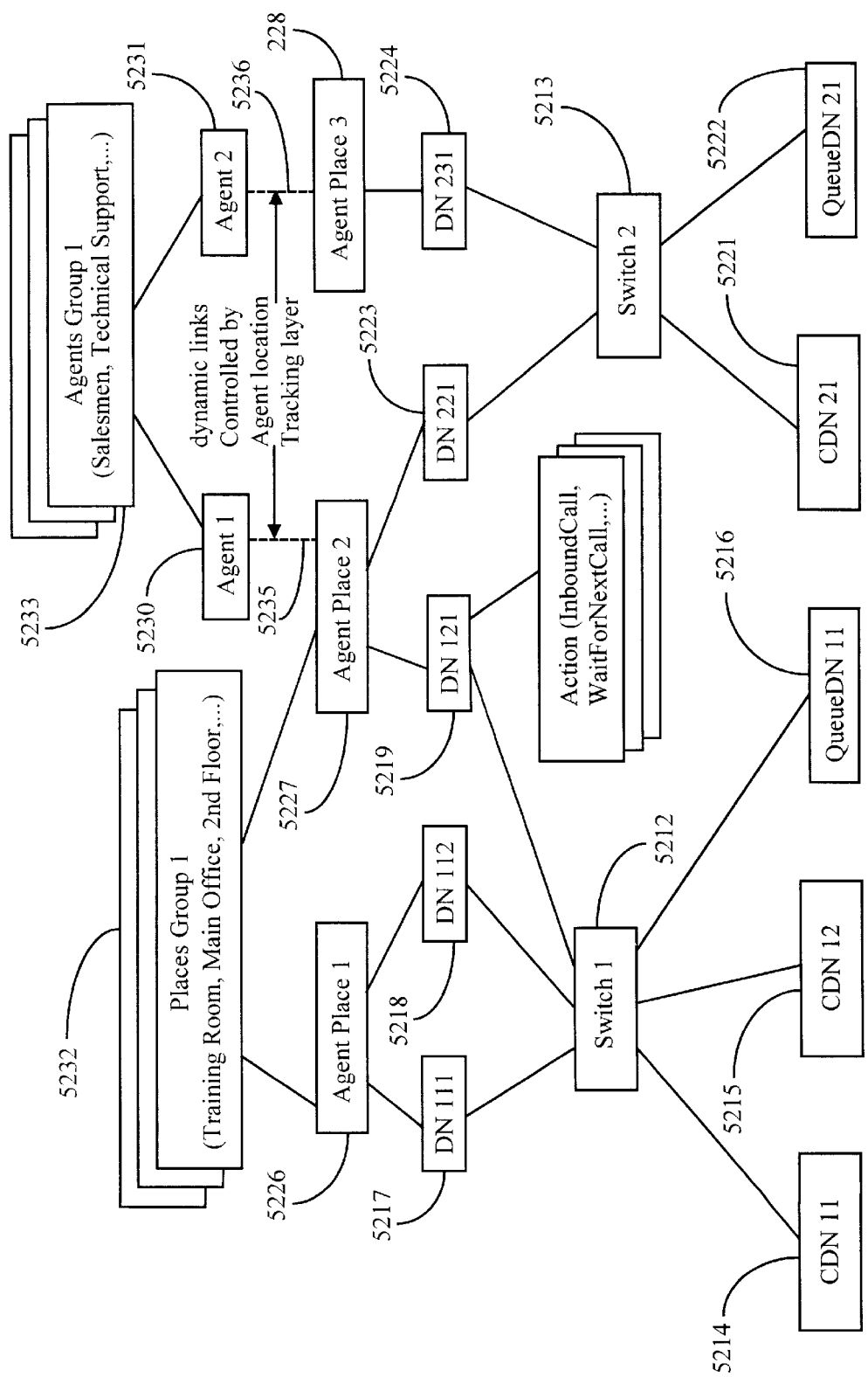
FIG. 20 is a schematic diagram illustrating objects used in a stat-server of the multiple call centers system of the present invention.

FIG. 20 is used to illustrate the above described objects. It shows two switch objects 5212 and 5213 simulating two physical switches in one or more call centers. Switch object5 212 comprises the following resources: CDN objects 5214 and 5215, queueDN object 5216, and DN objects 5217–5219. Similarly, switch object 5213 comprises the following resources: CDN object 5221, queueDN object 5222, and DN objects 5223–5224. These objects represent the corresponding CDN, queues, and agent DNs in the physical switches.

The agent DN objects 5217–5219 and 5223–5224 are also included in agent place objects. In this example, agent place object 5226 includes DN objects 5217 and 5218, agent place object 5227 includes DN objects 5219 and 5223, and agent place object 5228 includes DN object 5224. It should be noted that the DNs from two different switches can be associated with the same agent place.

Some of the agent place objects can be grouped together to form place group objects. In FIG. 20, only one place group object 5232 is shown.

FIG. 20 also shows a plurality of agent objects, such as objects 5230 and 5231. In this example, agent object 5230 is dynamically link to agent place object 5227 using the above mentioned agent location tracking routine, shown in FIG. 20 as a dashed line 5235. Similarly, agent object 5231 is dynamically link to agent place object 5228 using the above described dynamical tracking routine (shown as a dashed line 5236 in FIG. 20).

Some of the agent objects can be grouped into agent group objects. In FIG. 20, only one agent group object 533 is shown.

Stat-server 5190 provides a set of APIs for its clients to obtain statistics for various objects, such as objects associated with agents, agent groups, agent places, place groups, route points, queues, etc. Statistics could be current objects states representation (e.g., current agent status, current number of active calls in a group, etc.) or historical states representation. Historical representation are accumulated information for certain time intervals (e.g., total number of calls, total talk time, average talk time, etc.). Thus, the clients have to specify the time interval of interest. Examples of time intervals are:

(a) SGrowingWindow: The start time is fixed (e.g., 9:00 AM) while the end time is sliding (e.g., "till now"). For example, the client may request the total number of calls between 9:00 AM and now.

(b) SSlidingWindow: The time interval is fixed while the start and end times are sliding. Example: the average call length for the past hour.

Returning now to the description of objects, each object has one or more states. In one embodiment of the present invention, agent DN objects may have the states shown in Table 1. It should be noted that the number and nature of states are implementation details, and thus, can easily be changed by persons skilled in the art.

TABLE 1

| | | |
|---|---|---|
| (1) | NotMonitored: | The CTI server is not currently tracking the status of this agent DN. Consequently, the stat-server is not accumulating statistical information for this DN. |
| (2) | Monitored: | The agent DN is monitored by the CTI server. |
| (3) | LoggedIn: | It indicates that an agent has logged in to the agent DN. |
| (4) | OnHook: | It indicates that an agent DN is on hook and is waiting for a call. |
| (5) | WaitForNextCall: | This is active at almost all time, even when this agent DN has active calls or when there is no agent (for the possibility of leaving a voice mail message). The only situation in which WaitForNextCall is not active is when a predetermined key is pressed (see NotReadyForNextCall below). |
| (6) | OffHook: | It indicates that the telephone receiver is offhook. However, other states can be active even when the receiver is offhook (e.g., WaitForNextCall). |
| (7) | CallDialing: | It indicates that an agent has dialed a call but that the call is not yet established. |
| (8) | CallRinging: | It relates to an action occurring on an agent DN from the moment an inbound call begins ringing to the time just before the handling of the call by an agent. |
| (9) | NotReadyForNextCall: | This refers to a hardware condition preventing the receipt of calls. It is usually activated by pressing a predetermined key. |
| (10) | OfflineWorkType1: | It indicates that an agent is offline to do |

TABLE 1-continued

| | | |
|---|---|---|
| (11) | OfflineWorkType2: | work that can be classified as type 1. It indicates that an agent is offline to do work that can be classified as type 2. |
| (12) | CallOnHoldUnknown: | It indicates that a call of unknown type is on hold. |
| (13) | CallOnHoldConsult: | It indicates that a consulting call is on hold. |
| (14) | CallOnHoldInternal: | It indicates that an internal call is on hold |
| (15) | CallOnHoldOutbound: | It indicates that an outbound call is on hold |
| (16) | CallOnHoldInbound: | It indicates that an inbound call is on hold |
| (17) | CallUnknown: | It indicates that the CTI server cannot determine whether the call is a consult, internal, outbound, inbound or on-hold call. |
| (18) | CallConsult: | It indicates that a consulting call is in progress. |
| (19) | CallInternal: | It indicates that call between two extensions (internal calls) is in progress (i.e., when no prefix is used) |
| (20) | CallOutbound: | It indicates that an outbound call is in progress. |
| (21) | CallInbound: | It indicates that an inbound call is in progress. |
| (22) | LoggedOut: | It indicates that an agent has logged out from the agent DN. |
| (23) | CallDialed: | It indicates that a successful result was achieved when a call was dialed. |
| (24) | CallAbandonedFromDialing: | It indicates that during the process of a call dialing (and before another party answers), the agent hung up the phone. |
| (25) | CallAnswered: | It indicates that a call was answered. |
| (26) | CallAbandonedFromRinging: | It indicates that another party hung up the phone while a call was ringing. |
| (27) | CallAbandonedFromHolding: | It indicates that another party hung up the phone while a call was on hold. |

The above listed states correspond to actions that can be "executed" by an agent DN. As mentioned above, an agent DN could be in a plurality of these states at the same time (called herein the "active states"). In one embodiment of the present invention, the stat-server of the present invention reports to its clients an agent DN status that is equal to the active state having the highest priority. In the present invention, the priority is set by the clients of the stat-server. This is accomplished by the client sending a status priority table ("SPT") to the stat-server as part of the parameters in requesting information on the status of an agent DN. This table contains the same states shown in the listing of Table 1 such that these states are arranged in a priority order defined by that client. In reporting to the client, the stat-server reports a status corresponding to the active state of the agent DN having the highest priority as defined in the received SPT. It should be noted that the reported status could be the active state that corresponds to other priorities on the SPT. If the client requesting the information does not provide a SPT, a default SPT is used. Further, the client may provide a different SPT at separate requests for information.

One advantage of this aspect of the present invention is that each client can obtain information it deems to be the most pertinent. In the prior art system, the stat-server reports only one status for an agent DN to all the clients that request the information. In the present invention, the stat-server can report different status for the same agent DN to different clients, depending on the SPT parameters sent by the clients. Because each client receives the information it wants, the resource of the call center can be better utilized.

As pointed out above, each agent may has access to two or more telephones (i.e., agent DNs). In this case, the client may define an agent SPT indicating the priority of the actions in both agent DNs.

As an example, it is assumed that an agent has access to two agent DNs: the first DN has a state of "OfflineWorkType 1" and the second DN has a state of "WaitForNextCall." The status of the agent reported to the client is "OfflineWorkType1" if it has a higher priority. As another example, a client (e.g., routing server 5142) of the stat-server may consider the status of an agent to be "WaitForNextCall" when all the agent DNs associated with the agent have the "WaitForNextCall" state. This corresponds to the case when the agent is not actively performing any call center related activity (e.g., answering a call or using the workstation), and as a result, all the agent DNs are not being used and are waiting for a call. This priority arrangement is achieved by putting "WaitForNextCall" as the action having the lowest priority in an agent SPT. However, if there is a special or urgent call, routing server 142 may want to consider the status of the agent to be "WaitForNextCall" when there is at least one agent DN associated with the agent having the "WaitForNextCall" status. This corresponds to the case when the agent has access to at least one phone that is not being used. This priority setting is achieved by putting "WaitForNextCall" as the highest priority in the agent SPT.

In one embodiment of an agent SPT, the priority of the states are listed sequentially and separated by a comma, with the lowest priority listed first. The agent SPT with a lowest priority for "WaitForNextCall" would be: :"WaitForNextCall, . . . (other states)." On the other hand, the agent SPT with a very high priority for "WaitForNextCall" would be ". . . , WaitForNextCall, LoggedOut". In this case, the highest priority is "LoggedOut" and the priority just below it is "WaitForNextCall".

Agents can be arranged in groups. Group status is based on all included agent statuses. It is determined by a "Group SPT," which is similar to the Agent SPT and DN SPT. As an example, a Group SPT of ". . . , WaitForNextCall" means that the group will be in "WaitForNextCall" if there is at least one "WaitForNextCall" agent status.

Routing points and queues can also report different status to different clients in respond to different SPTs. The states of an exemplary routing point/queue are shown in table 2.

TABLE 2

| | | |
|---|---|---|
| (1) | NotMonitored: | The CTI server is not currently tracking the status of this DN. Consequently, the stat-server is not accumulating statistical information for this DN |

TABLE 2-continued

| | | |
|---|---|---|
| (2) | Monitored: | The routing point/queue is monitored by the CTI server. |
| (3) | NotReadyForNextCall: | This state occurs when a PBX source used for routing or a queue DN has reached capacity. Note that this capacity is very large and is not normally reached. |
| (4) | CallWait | Call is holding on a routing point/queue |
| (5) | CallEntered | This is an "instant" action indicating that a new call has just entered a routing point or queue. |
| (6) | CallDistributed | It indicates that a call previously in a routing point/queue has just been agent. |
| (7) | CallAbandoned | This indicates that a customer just hung up while the call is at a routing point or in a queue. |
| (8) | WaitForNextCall: | This indicates that a routing point/queue still has a capacity to handle more calls. |

In one embodiment of the present invention, there are two main calls that allow clients to obtain statistics from the stat-server. The first call is "SGetStat." This call requests the stat-server to return statistics of interest only once. The second call is "SOpenStat." It means that the client is interested in receiving statistics on a continuous basis. The client can further set up various criteria for the stat-server to notify the client and report statistics. For example, the client can specify that notification takes place only when the new value is greater than the last reported value by a predefined percentage. Alternatively, the client can specify that notification takes place at predefined time intervals.

One of the parameters of the SGetStat and SOpenStat calls relates to the SPT. In one embodiment of the present embodiment, the parameters for each of these calls contain a pointer to a data structure having a number of optional fields. The SPT for agent DN, agent, group, and routing point/queue each occupies one of these optional fields. Thus, an application can define the appropriate SPTs and incorporate them in the data structure. This data structure is used to invoke the SGetStat and SOpenStat calls.

In an embodiment in which multiple switches are monitored by the same stat-server, the above mentioned calls also contain a parameter allowing the client to indicate the switch of interest.

System for Routing Electronic Mails (3223)

The present invention comprises a novel routing system for electronic mails and related methods. The following description is presented to enable any person skilled in the art to make and use the invention. Decryption of specific applications is provided only as examples. Various modifications to the preferred embodiments will be readily apparent to those skilled in the art, and the general principles defined herein may be applied to other em bodiments and applications without departing from the spirit and cope of the invention. Thus, the present invention is not intended to be limited to the embodiments shown, but is to be accorded the widest scope consistent with the principles and features disclosed herein.

Figure 21:
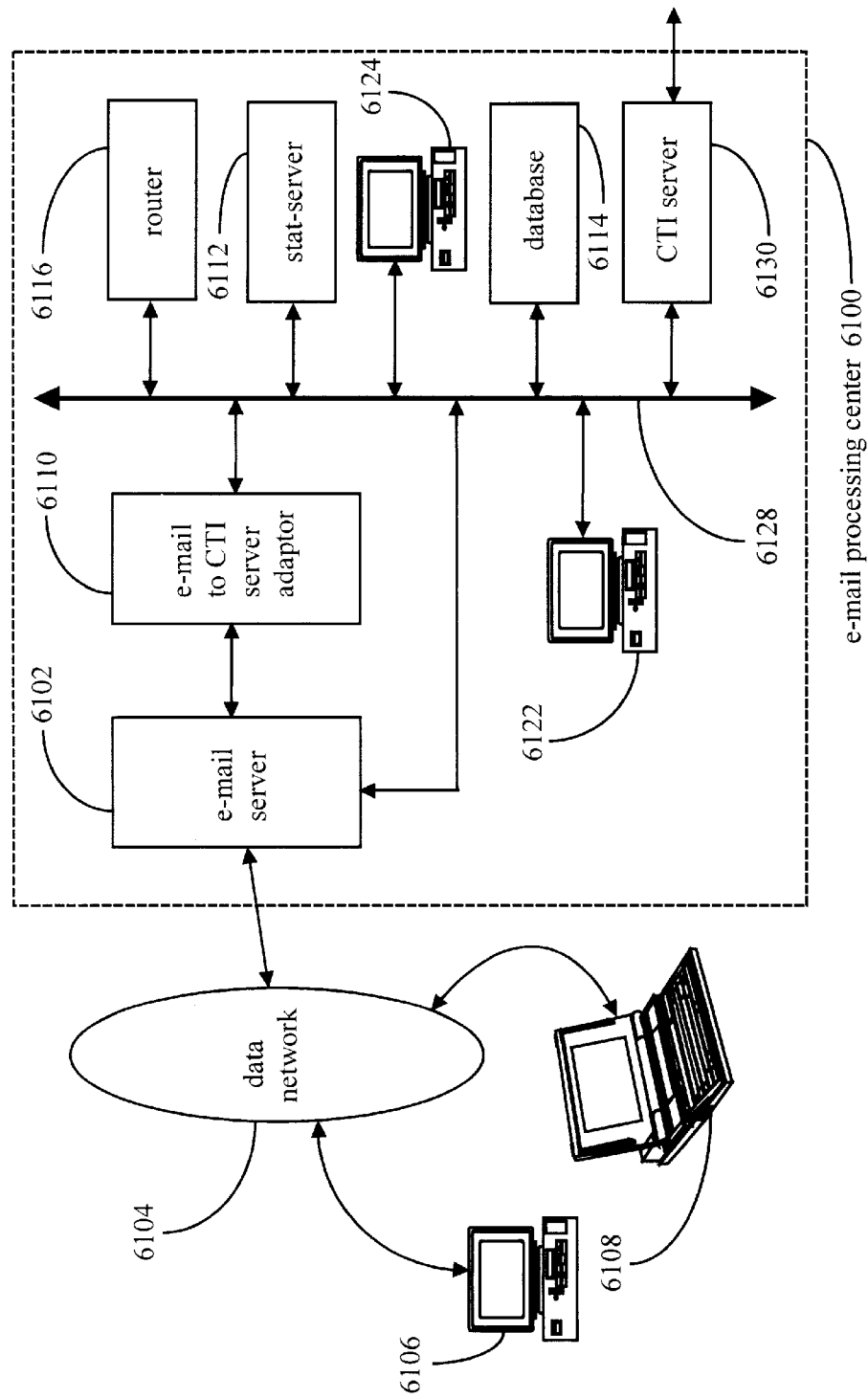
FIG. 21 is a block diagram showing an e-mail processing center of the present invention.

FIG. 21 is a block diagram showing an e-mail processing center 6100 of the present invention. Processing center 6100 contains an e-mail server 6102 which is connected to a data network 6104. Data network 6104 could be a local area network or a wide-area network (such as the Internet or an Intranet). Other data processing devices, such as computers 6106 and 6108, are also connected to data network 6104. All the data processing devices can send e-mails to each other. As a result, some of the e-mails are sent to e-mail server 6102.

As an example, it is assumed that one of the addresses associated with e-mail server 6102 is "support@abc-company.com". This is an address for customers of a company named "ABC" to send in questions regarding products and services provided by the company. It is anticipated that the subject matters of the e-mails are diverse and the number of mails is large. For example, the e-mails may relate to all aspects of the products and services offered by ABC. Some of the e-mails may contain technical questions of a product. Other e-mails may report a bug in a software sold by ABC. A few e-mails may contain suggestions on improving the products and services. If support persons of ABC are assigned to answer some of the e-mails on a first come first serve basis, it would be very difficult for them to do so because it is almost impossible for a single person to know everything about ABC.

One aspect of the present invention is a system for automatically routing the e-mails to the most qualified and available support person. For example, a support person may be an expert in one product of ABC. All e-mails related to this product will be routed to this person automatically. Further, the system can distribute the load so that every support person receives approximately the same number of e-mails. As a result, the problems of the prior art systems can be solved.

Note that the criteria for determining whether a support person is available is not limited to e-mail activities. This is because the same support person may provide telephone and facsimile support to customer inquiries. Thus, the "availability" of a support person may involve a combination of activities involving telephone, facsimile, e-mail, data processing, etc.

Processing center 6100 contains a server 6112 that records all activity in the center. For example, it contains records of who are present in the center a a particular time and are available for service, as well as records of all e-mails that are pending and have been processed by center 6100. Server 6112 is called herein as the "stat-server." It should be noted that many types of information can be reorder, and the choice of information is determined on a case-by-case basis.

Processing center 6100 also contains a database 6114 that contains detailed information on each support person, products and customers. Information of support persons includes the skill set (e.g., product expertise, written language ability) and prior relationship with customers. Information of customers (bases on the incoming e-mail address) includes the content of their previous e-mails, the products they bought, their physical addresses (obtained from product registration information ), etc.

Processing center 6100 also contain s a router 6116. This router selects the most qualified and available support person to respond to a particular e-based on one or more algoritlhs (or scripts). Various factors in a routing strategy will be described below.

In one embodiment of the present invention, database 6114, router 6116 and stat-server 6112 could be a database, router and stat-server commonly used in telephony call centers. The advantage of this embodiment is that database, router and stat-server software for telephony applications are well developed and widely available. The use of existing software (or slightly modified versions)could speed up product development time. In telephony applications, a server is used to provide computer telephony integration (CTI) by controlling an automatic call distributor (a telephony hardware device for controlling telephone communication between the public telephone networks and telephones inside a call center) and communicating with a database, router and stat-server. This server is call herein the CTI-server. One of the functions of the CTI server is allowing automatic call distributors of different vendors to be used with the same database, router and stat-server.

In this embodiment, a CTI-server 6130 and an e-mail-to-CTI-server adapter 6110 is preferably included. As explained above, CTI-server 6130 provides a common interface for communicating with database 6114, router 6116 and stat-server 6112 via a digital communication network 6128. Because these software products are based on telephony applications, some of the attributes used therein may not be exactly the same as that used in e-mail applications. For example, the attribute of "telephone number" in telephony application is not used in e-mail applications. Similarly, the e-mail attribute of "sender's e-mail address" may not be recognizable in telephony applications. These two attributes have similar characteristics, and can be used interchangeably provided that they are formatted and used properly. One of the functions of adapter 6110 is to provide conversion between e-mail attributes and telephony attributes.

Figure 22:
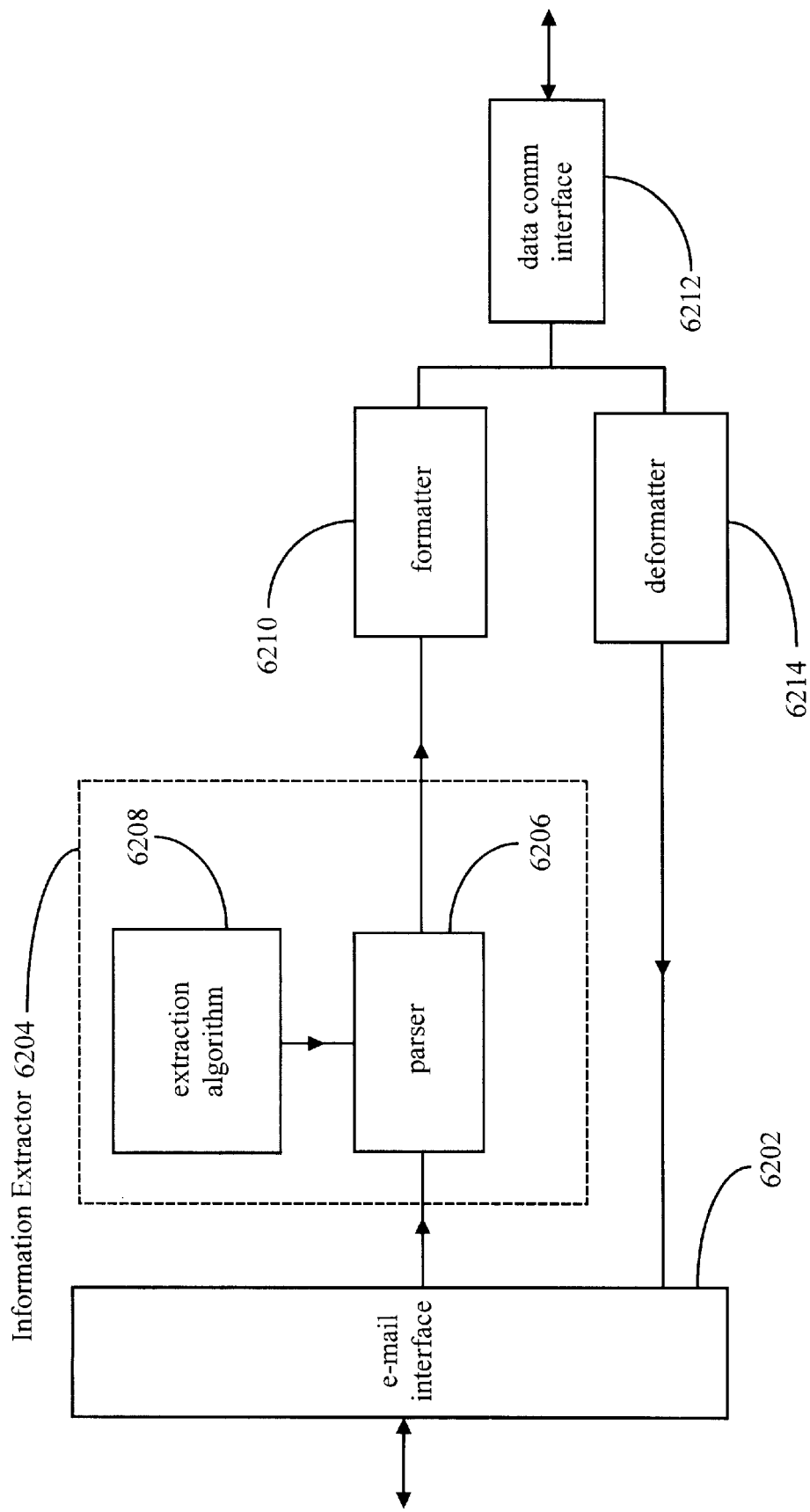
FIG. 22 is a block diagram of a e-mail to CTI server adapter used in the e-mail processing center of the present invention.

FIG. 22 is a block diagram of e-mail-to-CTI-server adapter 6110. It includes an e-mail interface 6202 for sending data to and receiving data from e-mail server 6102. Adapter 6110 also includes an information extractor 6204 for extracting relevant information from e-mails. Extractor 6204 contains a parser 6206 for parsing the content of the e-mails obtained from e-mail server 6102. Extractor 6204 also contains a storage device for storing an algorithm 6208 which directs parser 6206 to extract appropriate information from the content of the e-mails in accordance with predetermined criteria. The extraction algorithm in extractor 6204 is changeable because the coding in algorithm 6208 could be changed. Examples of relevant information are:

(a) Addresses: Typically, an e-mail has a portion that contains the addresses of the sender and recipient. Extractor 6204 directs parser 6206 to extract these e-mail addresses.

(b) Time Stamp: Some e-mail contains the date and time an e-mail is sent. Extractor 6204 could direct parser 6206 to extract this information. This information may be more accurate that the time e-mail server 6102 receives the e-mail because some e-mails may be delayed for more than a day due to network problems.

(c) Keyword: Extractor may direct parser to conduct a keyword search on the content of the e-mails. Example of keywords are name of relevant products and services provided by the company, special words such as "bugs", "virus", "crash" (for software products), "overheat" and "electric shock" (for hardware products), and words of urgent nature (such as "urgent", "ASAP", and "fast").

Adapter 6110 contains a formatter 6210 for formatting the relevant information into attributes that can be understood by CTI-server 6130. As an example, the sender's e-mail address could be formatted as a caller's telephone number (which is a telephony attribute). The formatted attribute is sent to a data communication interface 6212 which communicates the attributes to CTI server 6130 via communication network 6128.

Adapter 6110 also contains a deformatter 6214 that accepts data and commands from CTI-server 6130 and translate them to a form understood by e-mail server 6102. As explained below, router 6116 may send (via CTI-server 6130) commands to e-mail server 6102.

Returning now to router 6116, some examples of support person selection criteria are:

(a) the product expertise of the support person;

(b) language ability of the support person;

(c) activities the support person (e.g., how many e-mails have this person processed and how many are pending);

(d) work load of other support persons in the center (for load balance among various support persons);

(e) the language of the incoming e-mail;

(f) the subject matter of the incoming e-mail;

(g) information about the sender;

(h) overall activities of the center (e.g. Whether the support persons need to process jobs other than e-mails); and (i) the urgency of the matter.

Processing center 6100 contains a number of computer terminals, such as computers 6122 and 6124, managed by support persons. When a support person starts to work, he/she logs in so that stat-server 6112 knows who is working in center 6100 and how to reach the support person.

Router 6116 obtains information to make selection decision from stat-server 6112 and database 6114. Once a decision is made, router 6116 sends a command to e-mail server 6102 to route the e-mail to the selected computer terminal. The support person responds to the e-mail and sends the reply to e-mail server 6102, which delivers the reply to the sender via data network 6104.

Figure 23:
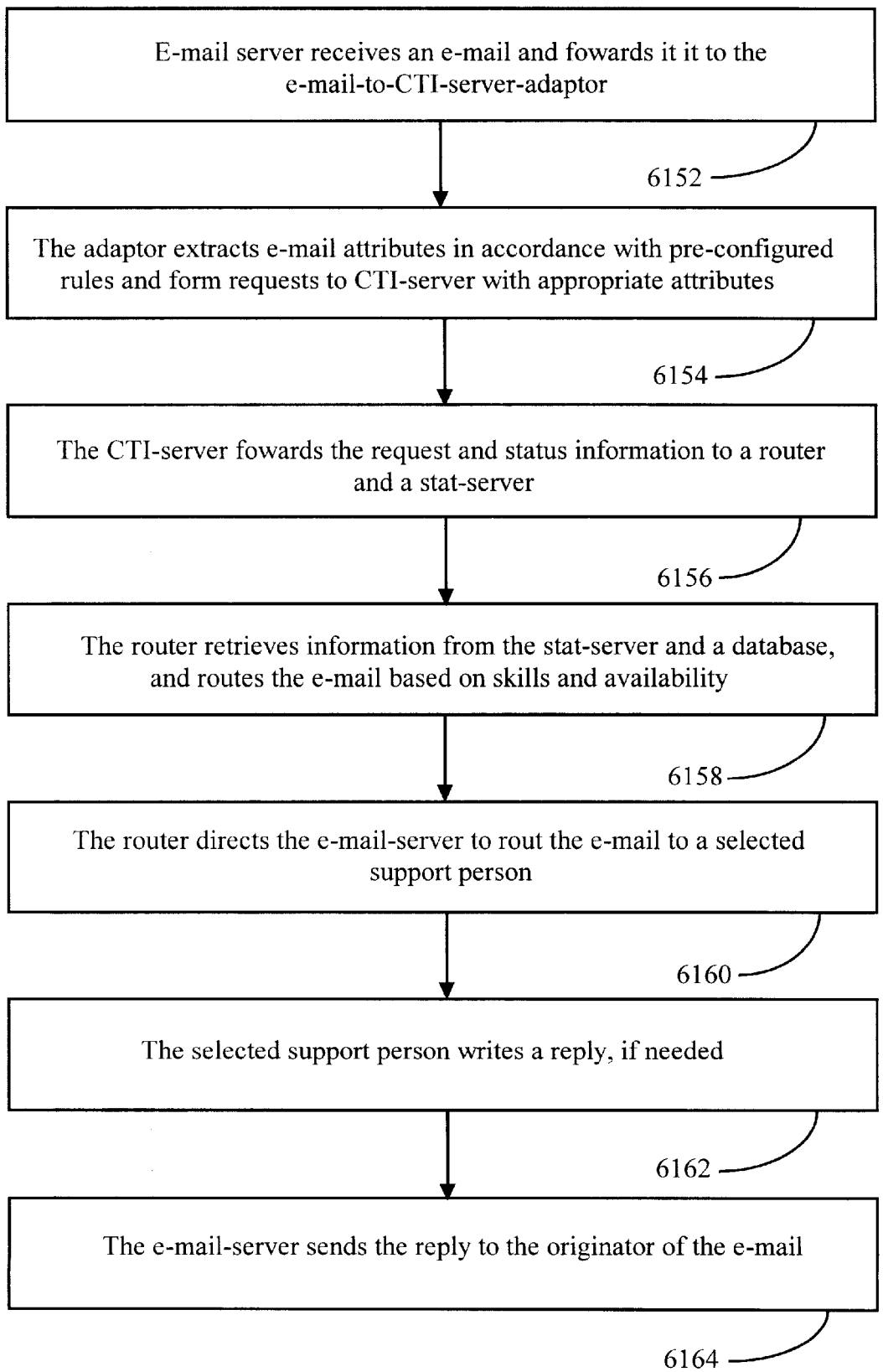
FIG. 23 is a flow chart showing the operation of the e-mail processing center of FIG. 20.

A flow chart 6150 showing the operation of e-mail processing enter 6100 is shown in FIG. 23. In step 6152, e-mail server 6102 receives an e-mail. The e-mail is forwarded to e-mail-to-CTI-server adapter 6110. In step 6154, adapter 6110 extracts e-mail attributes in accordance with pre-configured rules (embodied in extraction algorithm 6208). It also sends status information and formulates requests to CTI-server 6130 using appropriate extracted attributes. In step 6156, CTI-server 6130 forwards the request and status information to router 6116 and stat-server 6112. In step 6158, router 6116 retrieves information from stat-server 6112 and database 6114 so as to make routing decision. In step 6160, router 6116 instructs e-mail server 6102 to route the e-mail to the computer terminal used by a selected support person, such as computer 6122. Because the instructions from router 6116 may be coded in telephony-related commands, these instructions may need t pass through CTI-router 6130, deformatter 6210 and e-mail interface 6202. Upon receiving the e-mail, the support person processes the e-mail using computer 6122. If there is a need to send a reply, the support person writes the reply (step 6162), and directs e-mail server 6102 to deliver the reply to a recipient connected to data network 6104 (step 6164).

In addition to providing basic routing function, router 6116 may also have a strategy to handle exception situations. For example, if an incoming mail is not answered by the selected support person within a predetermined time interval (e.g., three days), the mail is re-routed to another qualified and available support person. This strategy prevents mails from being dropped. As another example, there may be times when the number of incoming mails exceeds the available resource to answer these mails (i.e., overflow). Router 6116 could store these mails in a queue and direct e-mail server 6102 to alert senders that it may take a little longer to receive a reply.

It should be noted that if router 6116, stat-server 6112 and database 6114 are designed strictly for e-mail applications, there is not need to have CTI server 6140, formatter 6210 and deformatter 6214. In this case router 6116, stat-server 6112 and database 6114 can communicate with e-mail server 6102 and information extractor 6204 directly.

Internet Protocol Network Telephony (IPNT)

In all of the embodiments and aspects of the invention described above specific example have been drawn principally from the technological area of conventional intelligent telephony networks, other than what is now known as Internet protocol network telephony (IPNT), wherein computers simulate telephones through software, microphones, and speakers, and telephony data between such equipped computers is transmitted over Internet (and sometimes other data networks, such as Intranets) connections and directed by servers, such as destination number servers (DNS) in the Internet. In the IPNT world IP addresses are used instead of telephone numbers, and there are differences in the way data packets are formulated and transmitted. Moreover, what may be termed routing is done by such as IP switches and hubs, wherein destination addresses may be changed. These differences, however, are not limiting in embodiments of the present invention.

In many embodiments of the invention described, the inventions are involved with new and unique ways to use machine intelligence for telephony functions, particularly, but not exclusively, as these functions relate to call centers and intelligent routing of calls. In instances of the invention described, as will be readily apparent to those with skill in the art, the principles of the invention may also be applied to IPNT without undue experimentation.

As examples of IPNT application, in those embodiments dealing with personal routing and personal routers, the methods and apparatus described may also be adapted to IPNT so personal routing rules, negotiation, and the like may be provided for IPNT calls as well. In the aspects of the invention dealing with simulation of CTI applications and testing, the applications may apply to IPNT telephony as well as to more conventional telephony systems. Other examples will be apparent to those with skill in the telephony arts.

It will be apparent to those with skill in the art that there are many alterations that may be made in the embodiments of the invention herein described without departing from the spirit and scope of the invention. Some of these have been described above Many of the functional units of the system in embodiments of the invention may be implemented as code routines in computerized telephony equipment, computer servers, and individual workstations. It is well-known that programmers are highly individualistic, and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the present invention in it's several aspects described. The invention is limited only by the breadth of the claims below.

What is claimed is:

1. A system for routing an electronic mail (e-mail) to one of a plurality of agents in an Internet Protocol Network Telephony call center, each of said agents having a specific skill set from a variety of possible skill sets, the system comprising:

an e-mail server adapted to receive said e-mail from a sender;

an information extractor for extracting information from said e-mail;

a router; and a database accessible to the router and storing skill sets of said agents;

wherein the router selects the one of a plurality of agents by matching stored information about the specific skill sets with portions of extracted information from said e-mail.

2. The system of claim 1 further comprising a statistics server (stat-server) recording activities of said call center, and wherein said routing performed by said router further uses said recorded activity in said stat-server.

3. The system of claim 2 wherein routing of e-mails to selected agents is load-balanced based on recorded activity stored in said stat-server.

4. The system of claim 1 wherein an overload threshold is set for number of e-mails to be routed, and senders of e-mails are notified of a possible delay when the threshold is exceeded.

5. The system of claim 1 wherein said database further stores information on senders of e-mails, and routing performed by said router further uses said stored information on senders of e-mails.

6. The system of claim 5 wherein said database stores information about prior relationships of agents and e-mail senders, and said router uses said relationship information in making routing decisions.

7. The system of claim 1 wherein a time limit for response to e-mails by said agents is set, and wherein e-mails not answered within said time limit are rerouted to other agents.

8. The system of claim 1 wherein said information extractor comprises plural and selectable extraction algorithms.

9. The system of claim 8 wherein one of the extraction algorithms includes a parser, and wherein said one of the extraction algorithms uses the parser to search for keywords in said e-mail.

10. A method for routing electronic mails (e-mails) in an Internet Protocol Network Telephony (IPNT) call center having a plurality of agents, comprising steps of:

(a) receiving e-mails at an e-mail server in the call center;

(b) extracting information from the e-mails;

(c) matching extracted information with skill sets of agents; and (d) selecting a specific agent to receive a specific e-mail based on results of the matching step (c).

* * * * *